(12) United States Patent
Mann

(10) Patent No.: US 7,503,418 B2
(45) Date of Patent: Mar. 17, 2009

(54) PRESSURIZED FLUID-BASED POWER SYSTEM FOR DEVICES, SUCH AS VEHICLE DRIVETRAINS

(76) Inventor: Randall C. Mann, 2414 N. Fourth St., Minneapolis, MN (US) 55411

( * ) Notice: Subject to any disclaimer, the term of this patent is extended or adjusted under 35 U.S.C. 154(b) by 0 days.

(21) Appl. No.: 11/760,134

(22) Filed: Jun. 8, 2007

(65) Prior Publication Data
US 2007/0284177 A1    Dec. 13, 2007

Related U.S. Application Data

(60) Provisional application No. 60/849,325, filed on Oct. 4, 2006, provisional application No. 60/811,811, filed on Jun. 8, 2006.

(51) Int. Cl.
*B60K 17/00* (2006.01)
(52) U.S. Cl. .................... 180/305; 180/306; 180/307
(58) Field of Classification Search ............. 180/54.1, 180/65.3, 165, 305, 306, 308; 60/413, 597, 60/512, 595, 668
See application file for complete search history.

(56) References Cited

U.S. PATENT DOCUMENTS

| | | | |
|---|---|---|---|
| 2,941,608 A | 6/1960 | Parrish | |
| 3,648,458 A | 3/1972 | McAlister | |
| 3,712,489 A | 1/1973 | Jamison | |
| 4,043,122 A | 8/1977 | Graham | |
| 4,227,587 A * | 10/1980 | Carman | 180/165 |
| 4,753,078 A | 6/1988 | Gardner, Jr. | |
| 4,825,656 A | 5/1989 | Gardner Jr. | |
| 4,865,152 A * | 9/1989 | Gardner, Jr. | 180/305 |
| 5,579,640 A * | 12/1996 | Gray et al. | 60/413 |
| 5,647,734 A * | 7/1997 | Milleron | 60/595 |
| 6,073,445 A * | 6/2000 | Johnson | 60/512 |
| 6,719,080 B1 * | 4/2004 | Gray, Jr. | 180/165 |
| 6,834,737 B2 * | 12/2004 | Bloxham | 180/165 |

OTHER PUBLICATIONS

PCT Search Report (mailed Aug. 25, 2008); 8 pgs.

* cited by examiner

*Primary Examiner*—Hau V Phan
(74) *Attorney, Agent, or Firm*—Dicke, Billig & Czaja, PLLC

(57) ABSTRACT

A power system for a vehicle drivetrain including a cylinder, first and second pistons, and a pressure source. The cylinder defines a central bore, a first inlet adjacent a first end, and a second inlet adjacent a second end. The pistons are coaxially disposed within the central bore, and each includes a leading end, a trailing end, and a piston body. The leading end is movably sealed within the central bore. The trailing end extends from the cylinder for coupling to the drivetrain. The piston body defines an outer diameter that is at least 75% of a diameter of the central bore. The pressure source is in fluid communication with the inlets. Forced flow of working fluid into the first inlet and release of working fluid from the second inlet effectuates movement of the pistons, and vice-versa. Reciprocating movement of the pistons provides power to the drivetrain.

19 Claims, 14 Drawing Sheets

PRESSURIZED FLUID-BASED POWER SYSTEM FOR DEVICES, SUCH AS VEHICLE DRIVETRAINS

CROSS-REFERENCE TO RELATED APPLICATIONS

The subject matter of this application is related to the subject matter of U.S. Provisional Application Ser. No. 60/811,811, filed Jun. 8, 2006 and entitled "Pressurized Fluid-Based Power System for a Vehicle Drivetrain," and U.S. Provisional Application Ser. No. 60/849,325, filed Oct. 4, 2006 and entitled "Pressurized Fluid-Based Power System For Multiple Equipment And/Or Devices," priority to which is claimed under 35 U.S.C. §119(e) and an entirety of each of which is incorporated herein by reference.

BACKGROUND

The present disclosure relates to powered equipment. More particularly, it relates to power systems that utilize pressurized fluid as the driving force, and that are adapted for use in numerous applications, for example as a replacement for the conventional internal combustion engine used with vehicles.

The fuel-burning engine has long been used to power a number of different vehicle types (e.g., automotive, motorcycle, all terrain vehicle, etc.), as well as a wide variety of other motorized devices, equipment, and appliances. For example, many home appliances make use of compressed fluid during operation thereof (air conditioner, freezer, etc.). The motorized compressor associated with these and other devices is powered by the home's electrical system, that in turn draws power from a central, fossil fuel-burning power plant. Other home appliances (and, more generally, home equipment) also oftentimes require electrical power via the home's electrical system (and/or via a battery that is re-charged though the home's electrical system). While these and other industries are constantly striving to implement design features to improve energy efficiency, operation of motorized equipment by necessity requires a continuous supply of fossil fuel, or of electricity that in turn is generated by a power plant burning fossil fuel. As the price continues to rise, the unfettered demand for fossil fuel by the hundreds of millions of consumers worldwide has created a marked economic drain. Further, while pollution control efforts have reduced the level of harmful emissions, the fact remains that conventional, internal combustion engines, as well as fuel-burning power plants, have and will continue to pollute the environment when burning fuel.

In light of the above, various attempts have been made to develop a viable alternative to the internal combustion engine, especially in the context of automotive vehicles (with potential application to powering of other devices). For example, hybrid vehicles (i.e., vehicle power systems involving both an electric motor and an internal combustion engine) have been received with some enthusiasm by the consuming public. However, these hybrid vehicles still consume fossil fuels and generate noxious emissions (albeit at reduced levels). Battery-powered motors have also been suggested, although have not received wide market acceptance, likely due to reduced top speeds and power (as compared to conventional internal combustion engines), as well as overt limits on travel distance before re-charging of the batteries required. Further, the batteries themselves present certain environment hazards, and require energy from a separate power source (conventionally a fossil fuel burning power source) for re-charging.

In recognition of the above and other deficiencies, other efforts have focused upon developing a vehicle power system that is pneumatically or hydraulically controlled or powered. For example, U.S. Pat. No. 4,753,078 describes an electrohy-draulic vehicle drive system that is pneumatically or hydraulically controlled and has electricity as its power source. While promising, the electrically or battery-powered motor does not alleviate all of the issues described above. As a point of reference, U.S. Pat. No. 4,753,078 describes a plethora of other alternative and hybrid vehicle power systems, along with the deficiencies thereof.

While pneumatically or hydraulically driven equipment is well known, conventional pneumatic- or hydraulic-based systems are simply not viable for vehicular (e.g., automotive) and other applications. For example, a separate energy source is required to create pressure within the system prior to each use. In terms of user convenience, this is simply not acceptable. Further, size and fluid volume constraints associated with conventional pressurized cylinder/piston arrangements render such systems non-viable as a vehicle drivetrain power source. In order to power the drivetrain associated with a large, heavy vehicle in a manner sufficient to produce speeds in excess of 55 mph requires a conventional cylinder/piston arrangement of unworkable length and weight. In addition, the volume of fluid required to effectuate necessary displacement of the piston relative to the cylinder would overtly increase an overall size of the conventional hydraulic-based power system, as well as the responsiveness thereof, to unacceptable levels.

In light of the above, a substantial need exists for improved, pressurized fluid-based power systems. By eliminating the consumption of fossil fuels yet still providing the energy required by the equipment being powered (e.g., providing the power and speeds expected by vehicle operators), the fluid-based power system can revolutionize the automotive industry as well as virtually all motorized equipment industries.

SUMMARY

Aspects in accordance with the present disclosure relate to a power system for a vehicle drivetrain. The power system includes a cylinder, first and second pistons, and a common pressure source. The cylinder defines a central bore extending between first and second open ends. Further, the cylinder forms a first inlet adjacent the first open end, and a second inlet adjacent the second open end. The first and second pistons are coaxially disposed within the central bore. Each of the pistons includes a leading end, a trailing end, and a piston body. The leading end terminates at a head that is movably sealed within the central bore. The trailing end extends from the corresponding open end of the cylinder and is adapted for coupling to the vehicle drivetrain. The piston body extends between the leading and trailing ends, and defines an outer diameter that is at least 75% of a diameter of the central bore. Finally, the common pressure source is in fluid communication with each of the first and second inlets. With this configuration, forced flow of working fluid into the first inlet in conjunction with release of working fluid from the second inlet effectuates movement of the pistons in a first direction. Conversely, forced flow of working fluid into the second inlet and release of working fluid from the first inlet effectuates movement of the pistons in an opposite, second direction. Reciprocating movement of the pistons, in turn, provides power to the drivetrain. In some embodiments, the power system further includes a canister containing the working fluid, the canister being fluidly connected to the first inlet and the common pressure source such that pressure generated at the common pressure source acts upon the working fluid within the canister to selectively force the working fluid from the canister to the first inlet.

Other aspects in accordance with the present disclosure relate to a vehicle including the power system described above, along with a frame, wheels, and a drivetrain. The wheels are rotatably associated with the frame. The power system is also maintained by the frame. The drivetrain couples the power system to at least one of the wheels such that operation of the power system causes forced rotation of at least one of the wheels. In some embodiments, the vehicle further includes an actuation means including a user-operated foot pedal for controlling flow of working fluid to the first and second inlets.

DETAILED DESCRIPTION

Figure 1:
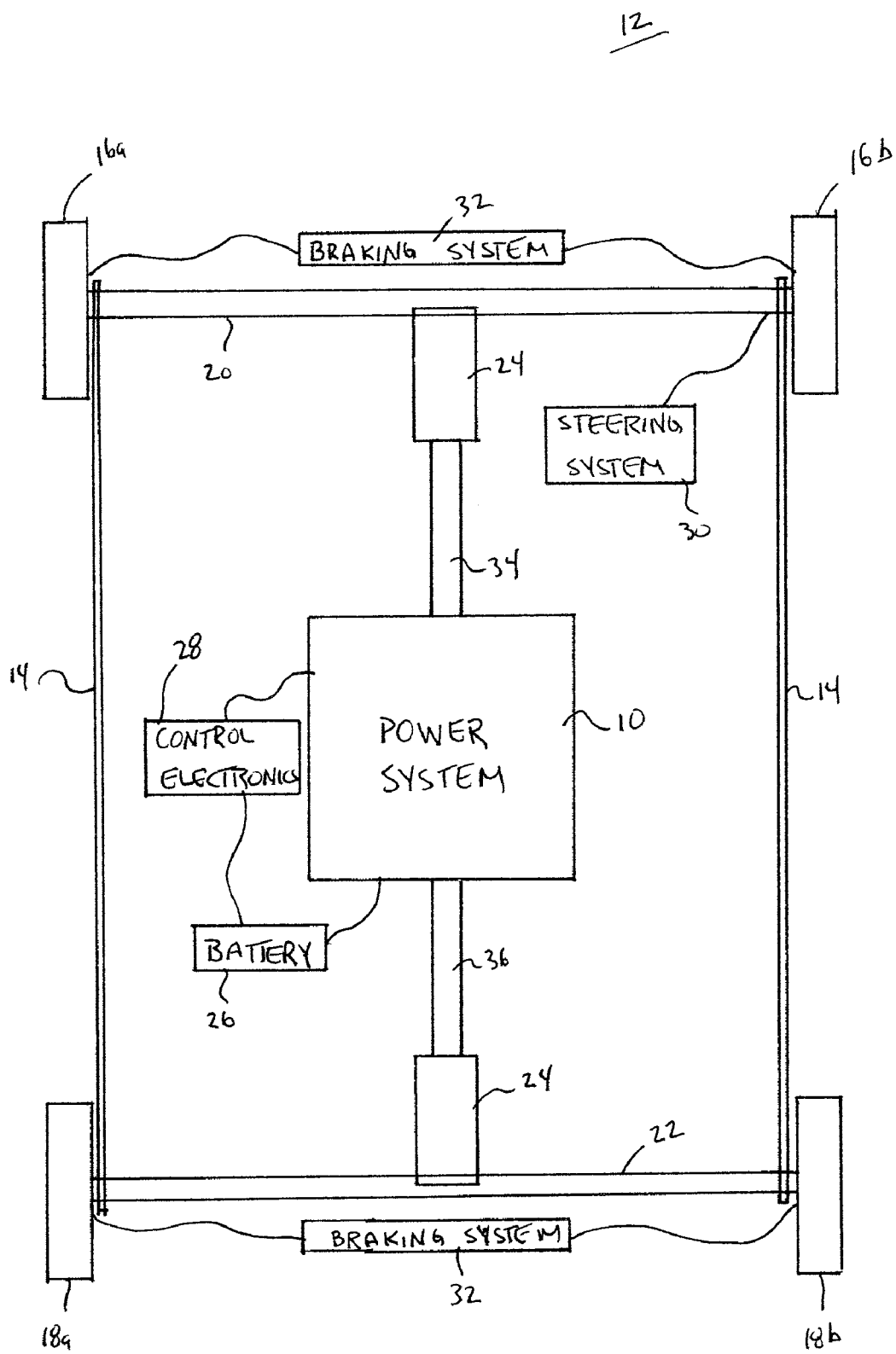
FIG. 1 is a schematic illustration, with portions shown in block form, of a vehicle incorporating a drivetrain power system in accordance with aspects of the present disclosure.

A power system 10 in accordance with aspects of the present disclosure is shown in block form in FIG. 1 as part of a vehicle 12. The vehicle 12 can assume a wide variety of configurations (e.g., automobile, truck, all terrain vehicle, snowmobile, boat, airplane, etc.), and can include components not otherwise depicted in FIG. 1 and/or can eliminate one or more of the features described below. Further, as described below, the power system 10 and/or portions thereof, can be used to power a wide variety of other equipment, either directly or by providing energy to re-charge a corresponding battery source. With this in mind, then, and in general terms, the vehicle 12 includes a frame 14 (referenced generally) maintaining the power system 10 as well as other components such as wheels 16a, 16b and 18a, 18b. In some embodiments, respective pairs of the wheels 16a, 16b and 18a, 18b are connected to one another, and driven by, a common axle 20 or 22, respectively. In some embodiments, the power system 10 is connected to, and causes rotation of, the axles 20, 22 via a drivetrain 24 (referenced generally). The drivetrain 24 can assume a wide variety of forms as known in the art, and can generally include gear(s), clutch(es), transmission(s), etc. With the embodiment of FIG. 1, the power system 10 is shown as driving both of the axles 20, 22. In other embodiments, however, the power system 10 can drive or rotate only one of the axles 20 or 22. Alternatively, the power system 10 can be directly linked (again, via an appropriate drivetrain) to one, two, or all of the wheels 16a, 16b, 18a, and/or 18b. Regardless, in some embodiments, the vehicle 12 further includes a battery 26 and control electronics 28 that otherwise operate to control operation and/or positioning of one or more sub-components of the power system 10 (e.g., pump(s), valve(s), etc.) as described in greater detail below. In addition, though not required, the vehicle 12 can include additional components or modules typically provided with vehicles, such as a steering system 30 and a braking system 32. Along these same lines, other common vehicle system components can be provided, but are not otherwise shown in FIG. 1.

In general terms, the power system 10 includes at least one pair of pistons 34, 36 (referenced generally in FIG. 1) that move in a reciprocating fashion relative to a cylinder (not shown in FIG. 1) via pressurized flow of fluid within the power system 10. While only a single pair of the pistons 34, 36 is shown in FIG. 1, in other embodiments, a plurality of piston pairs can be provided that may or may not be assembled within the vehicle 12, for example in a side-by-side fashion. Regardless, movement of the pistons 34, 36 is translated to the axle(s) 20 and/or 22 via the corresponding drivetrain 24, thus providing power to the wheel(s) 16a, 16b and/or 18a, 18b to effectuate rotation thereof in a desired direction.

Figure 2:
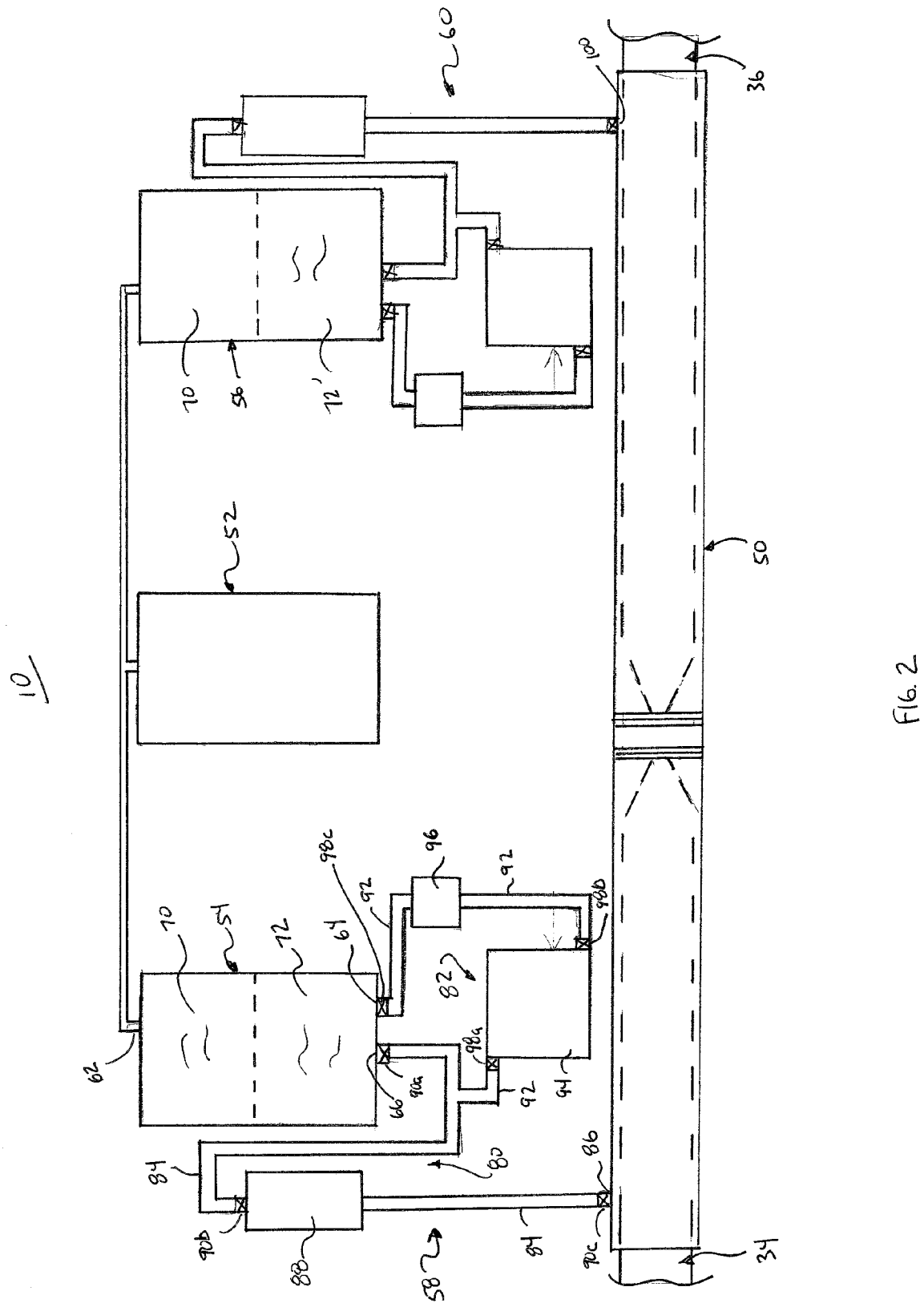
FIG. 2 is a schematic illustration of the power system of FIG. 1.

One configuration of the power system 10 in accordance with principles of the present disclosure is shown in greater detail in FIG. 2. The power system 10 includes the first and second pistons 34, 36 otherwise arranged as a piston pair relative to a common cylinder 50. In addition, the power system 10 includes a common fluid pressure chamber 52, a first pressurized canister 54, a second pressurized canister 56, a first fluid circuit 58, and a second fluid circuit 60. Details on the various components are provided below. In general terms, however, the common pressure chamber 52 maintains a desired minimum pressure within each of the first and second canisters 54, 56. The first canister 54 fluidly communicates pressurized fluid to and from one side of the cylinder 50, thus interacting with the first piston 34, via the first fluid circuit 58. Similarly, the second pressurized canister 56 fluidly communicates pressurized fluid to and from an opposite side of the cylinder 50, thus interacting with the second piston 36, via the second fluid circuit 60. With this arrangement, the fluid circuits 58, 60 operate to effectuate reciprocating movement of the first and second pistons 34, 36 relative to the cylinder 50 in a manner dictated by other components of the system 10 as described below.

The power system 10 is preferably formed as a fluidly sealed system such that fluid within the common chamber 52 is in fluidly sealed communication with the first and second canisters 54, 56. In some embodiments, the common chamber 52 is adapted to maintain, and pressurize, an appropriate fluid at desired pressures. For example, the common chamber 52 can serve as a source of pressurized air, with the chamber 52 being adapted to maintain its structural integrity at fairly high pressures on the order of 100-3,000 psi.

The first canister 54 and the first fluid circuit 58 are, in some embodiments, identical to the second canister 56 and the second fluid circuit 60, respectively. Thus, the following explanation of the first canister 54 and the first fluid circuit 58 applies equally to the second canister 56 and the second fluid circuit 60. With this in mind, the first canister 54 is adapted to contain one or more pressurized fluids, and includes or forms a pressure source inlet 62, a refill inlet 64, and an outlet 66. The pressure source inlet 62 is fluidly connected to the common chamber 52 via tubing 68. Conversely, the refill inlet 64 and the outlet 66 are in fluid communication with the fluid circuit 58, and thus the cylinder 50, as described below. With this in mind, in some embodiments, the system 10 is adapted such that the first canister 54 contains first and second fluids 70, 72. The first fluid 70 is commensurate with the fluid maintained by the common chamber 52, is preferably lighter than the second fluid 72, and serves to exert a pressure or force onto the second fluid 72. As a result, the second fluid 72 can flow, under pressure, through the first fluid circuit 58 and act upon the first piston 34 as described below. With this arrangement, by effectuating forced movement of the piston 34, the second fluid 72 serves as a working fluid, whereas the first fluid 70 is a pressurized fluid in that it ensures a necessary pressure within the canister 54. In some embodiments, the first fluid 70 is a gas (e.g., air), whereas the second fluid 72 is a liquid adapted to retain a desired viscosity under elevated pressure (e.g., hydraulic fluid such as oil, water, etc.). Alternatively, the system 10 can be adapted such that only a single fluid (i.e., the working fluid 72) is employed throughout the system 10.

The fluid circuit 58 facilitates flow of fluid (e.g., the second or working fluid 72) between the cylinder 50 and the first canister 54, and in some embodiments includes a primary channel 80 and a secondary or overflow channel 82 (the channels 80, 82 being referenced generally in FIG. 2). The primary channel 80 includes tubing 84 (referenced generally) extending from the outlet 66 of the first canister 54 to a first inlet 86 of the cylinder 50. In some embodiments, the primary channel 80 further includes a pump 88 or similar component useful for augmenting flow to or from the cylinder 50 (e.g., akin to a turbocharger). In some embodiments, the primary channel 80 can further include one or more valves 90a, 90b and/or 90c that further effectuate control over fluid flow. For example, in one embodiment, the valve 90a can be a one-way valve that prevents fluid flow back into the first canister 54. One or all of the valves 90a-90c can be mechanical valves, solenoid valves, etc. Alternatively, one or more of the valve(s) 90a-90c can be eliminated, or additional valves can be added. Further, operation or position of one or more of the valves 90a-90c is controlled via the control electronics 28 (FIG. 1) via appropriate electrical connectors (not shown).

The overflow channel 82 includes tubing 92 (referenced generally) fluidly connected to the primary channel 80, and fluidly connected to the refill inlet 64. The overflow channel 82 provides a means for ensuring desired fluid equilibrium within the first fluid circuit 58 during operation of the power system 10 (to otherwise reciprocally move the pistons 34, 36), as well as to periodically "refill" the first canister 54 with the working fluid 72 in an energy-efficient manner. With this in mind, in some embodiments, the overflow channel 82 includes a reservoir 94 and an outflow pump 96, and can further include one or more valves 98a, 98b and/or 98c that ensure fluid flow in a desired direction. The reservoir 94 retains excess fluid in a non-pressurized environment. Thus, for example, as the working fluid 72 is forced from the cylinder 50 (via the first inlet 86) and through the primary channel tubing 84, the one-way valves 90a, 98a dictate that this return fluid flows to the overflow channel tubing 92 and into the reservoir 94. When it becomes necessary or appropriate to re-supply the first canister 54 with a volume of the working fluid 72, the outflow pump 96 and valves 98b, 98c can be operated to force the working fluid 72 from the reservoir 94 to the first cylinder 54 via the refill inlet 64.

The overflow channel 82 can assume a wide variety of other configurations that may or may not include one or both of the reservoir 94 and/or the pump 96. For example, in some embodiments, the outflow pump 96 is a solenoid-based pump that is powered by a separate battery (e.g. the battery 26 of FIG. 1). Alternatively, however, the outflow pump 96 can be energized via an appropriate linkage to one or more of the vehicle's wheels 16a-18b (FIG. 1). Further, the overflow channel 82/outflow pump 96 can be fluidly linked to the vehicle's braking system 32 (FIG. 1) where the braking system 32 employs a fluid akin to the working fluid 72 utilized by the power system 10. With this configuration, upon application of the vehicle's brakes by the user, working fluid from the braking system 32 is used to refill the canister 54. Similarly, energy from the vehicle 12 (e.g., as the vehicle 12 is "coasting" down a hill) can be employed to pressurize the canister 54; upon release of pressure from the canister 54 (e.g., release of the pressurized fluid 70), equilibrium of the first canister 54/first fluid circuit 58 necessitates that the working fluid 72 will be drawn from the outflow reservoir 94 and back into the canister 54. Energy created as the vehicle 12 coasts down a hill and/or as the user periodically applies the brakes during downhill coasting can build up pressure that is above an operating pressure of the canister 54; this built-up pressure, in turn, can be used to force the working fluid 72 from the reservoir 94 back into the canister 54. In related embodiments, the vehicle's brake pedal serves as an actuator or input to an electric clutch or similar mechanism that in turn is connected to an axle otherwise associated with one or more pumps (e.g., rotationally assembled to the pump(s) such that spinning of the axle generates a pumping action) otherwise assembled to force spent working fluid 72 back to the canister 54. With this approach, the axle-driven pump(s) can be the outflow pump 96 mentioned above, or can be provided in addition to the separate outflow pump 96. Regardless, as the user depresses the brake pedal, the axle is caused to spin (e.g., the electric clutch is engaged), with the spent working fluid 72 being returned to the canister 54. In this regard, the axle can be driven to spin at increased speeds as the brake pedal is further depressed; alternatively or in addition, as the brake pedal is further depressed, a second or third pump is engaged. Further, as the brake pedal continues to be depressed, it engages the brake shoes or pads (conventionally provided with the braking system 32) to effectuate the slowing, stopping, or holding action desired by the user. In yet another alternative embodiment, the overflow channel 82 can employ energy created as the vehicle 12 traverses over a bump (akin to a shock absorber); this energy can, in turn, be utilized to effectuate a pumping action of the working fluid 72 from the reservoir 94 to the canister 54. In yet other embodiments, however, the overflow channel 82 can be eliminated.

Figure 3A:
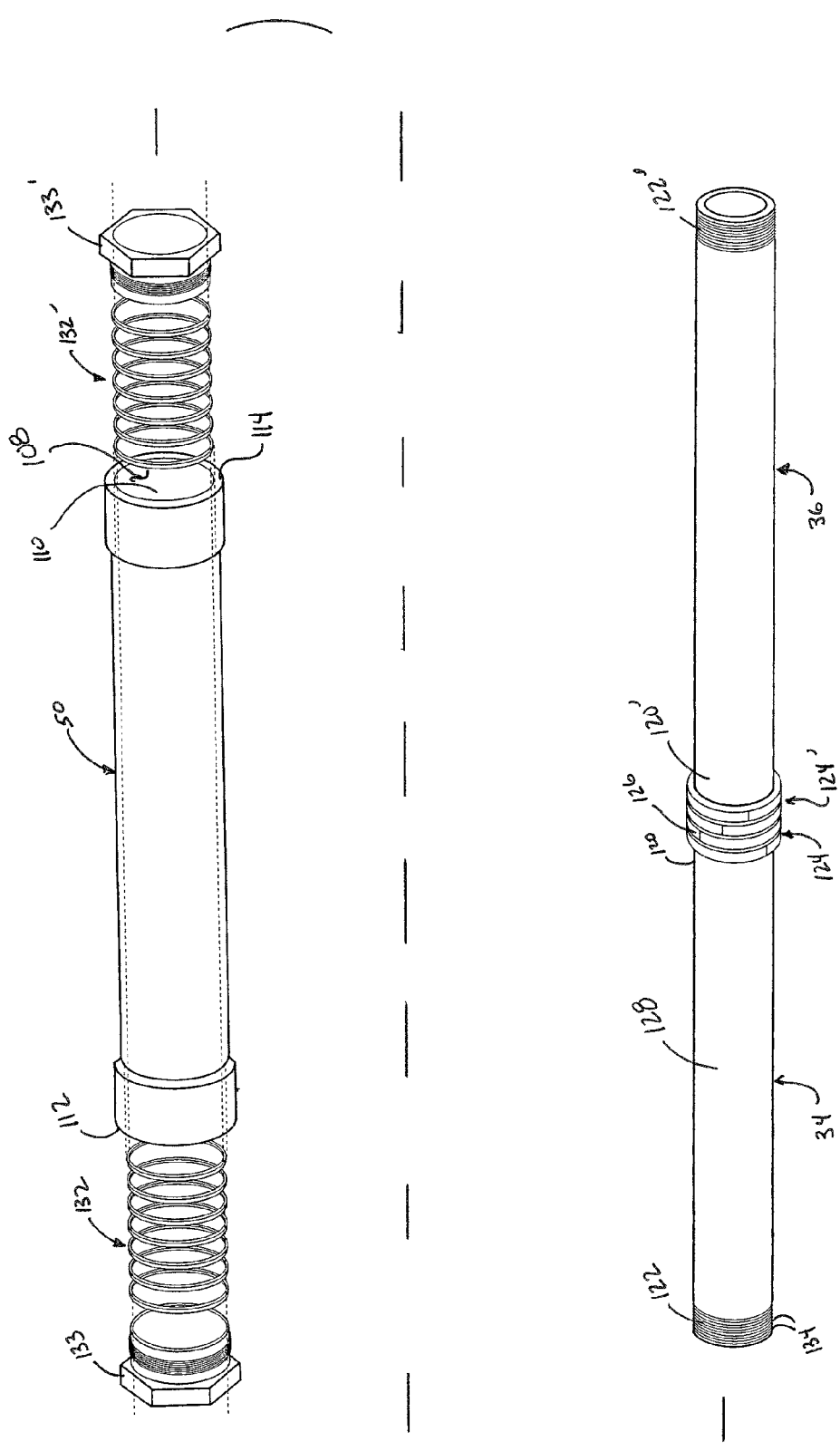
FIG. 3A is an exploded view of an embodiment piston/cylinder assembly in accordance with aspects of the present disclosure and useful with the power system of FIG. 2.
Figure 3B:
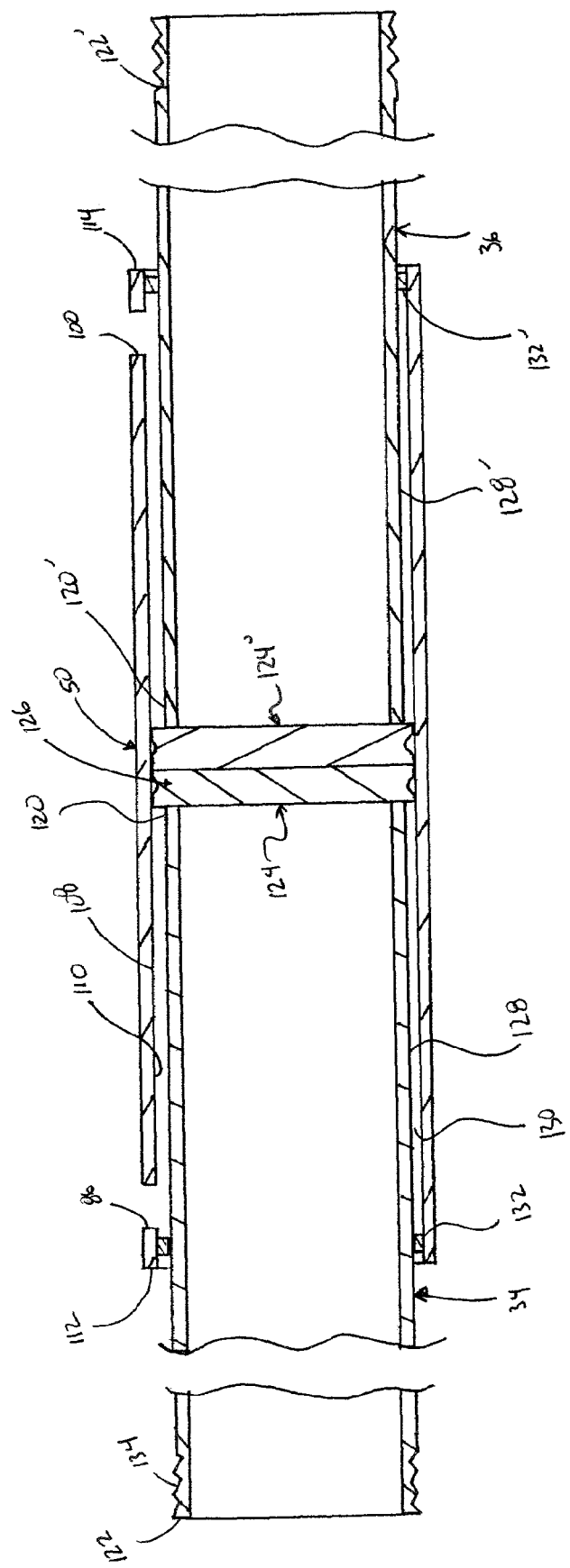
FIG. 3B is a cross-sectional view of the assembly of FIG. 3A.

As described above, the first canister 54/first fluid circuit 58 controls the forced delivery of the working fluid 72 to and from the first inlet 86 of the cylinder 50. The similarly-constructed second canister 56/second fluid circuit 60 controls the forced flow of the working fluid 72' to and from a second inlet 100 of the cylinder 50. With this in mind, and with additional reference to FIGS. 3A and 3B, the cylinder 50 includes an inner surface 108 forming a central passage or bore 110 extending from a first open end 112 to a second open end 114. As a point of reference, FIG. 3A is an exploded view of one embodiment of the pistons 34, 36/cylinder 50 assembly, whereas FIG. 3B illustrates the pistons 34, 36/cylinder 50 upon final assembly in cross-section with a length of the cylinder 50 being greatly reduced in the view of FIG. 3B relative to a diameter thereof for ease of illustration. The first inlet 86 (FIG. 3B) is formed adjacent the first open end 112 and is in fluid communication with the central bore 110. Similarly, the second inlet 100 (FIG. 3B) is formed adjacent the second open end 114 and is also in fluid communication with the central bore 110. The first and second pistons 34, 36 are coaxially disposed within the cylinder 50, and in particular the central bore 110 thereof. In this regard, the pistons 34, 36 are in some embodiments identical, each including a leading end 120, 120' and a trailing end 122, 122'. With specific reference to the first piston 34, the leading end 120 terminates at a head 124 that can form or be secured to a sealing body 126 that forms a seal within the cylinder 50 (e.g., has an outer diameter commensurate with a diameter of the central bore 110). In this regard, the sealing body 126 can assume a wide variety of forms, and can include, for example, two or more sealing rings exhibiting a low friction characteristic such that the sealing body 126 can be repeatedly moved (in an axial fashion) within and against the cylinder 50 without deterioration of the seal formed therebetween. Thus, the sealing body 126 can be formed from a variety of appropriate materials (e.g., silicone rubber) and can further include a lubricant (not shown) that enhances the desired sliding seal.

Regardless of the material(s) employed for the sealing body 126, in some embodiments, a body 128 of the piston 34 is tubular, and is formed of a high strength material (e.g., metal, plastic, fiberglass, etc). As compared to a solid shaft construction associated with a conventional piston-cylinder configuration, the tubular configuration of the piston 34 (as well as the second piston 36) reduces an overall weight of the power system 10. Alternatively, however, the piston body 128 can be solid.

Unlike conventional piston/cylinder arrangements for pneumatic or hydraulic power applications, the system 10 of the present disclosure forms the piston 34, and in particular the piston body 128, to have an outer diameter that is only slightly less than a diameter of the cylinder bore 110, resulting in a small gap 130 between the piston body 128 and the cylinder 50. In some embodiments, for example, an outer diameter of the piston body 128 is at least 75% of the diameter of the central bore 110; more preferably at least 80%; even more preferably at least 85%; and even more preferably at least 90%. In this regard, in order to maintain structural integrity under the high force requirements presented by operation of a vehicle, the cylinder 50 can be comprised of a high strength material, such as hardened steel. As a point of reference, then, with this material selection, in one exemplary embodiment, the cylinder 50 has an outer diameter of 3.125 inch and a bore diameter of 3 inches, whereas the piston body 128 has an outer diameter of 2.875 inches. It will be understood, however, that a wide variety of other dimensions are equally acceptable. Regardless, because the volumetric area or gap 130 between the piston body 128 and the inner surface 108 (otherwise defining the central bore 110) of the cylinder 50 is greatly reduced as compared to conventional piston/cylinder designs, only a small volume of the working fluid 72 (FIG. 2) is required to generate sufficient force onto the piston head 124/sealing body 126 sufficient to effectuate desired movement thereof. In this regard, a sealing member (shown as a series of rings in FIG. 3A) 132 is provided at or adjacent the first open end 112 that otherwise establishes a fluid seal between the cylinder 50 and the piston 34. The sealing member 132 can be formed of a wide variety of materials (e.g., one or more silicone rubber O-rings), and is able to withstand repeated axial movement of the piston 34 relative thereto. As such, fluid within the cylinder 50 is sealed between the sealing body 126 and the sealing member 132. A similar sealing member (e.g., ring(s)) 132' can also be provided at or adjacent the second end 114 of the cylinder 50. Alternatively or in addition, a separate pressurized seal can be formed at the cylinder 50/piston 34, 36 interfaces, such as by a hub 133, 133' (FIG. 3A) assembled over the respective ends 112, 114 of the cylinder 50. The hubs 133, 133' create a pressurized seal that prevents leaking of the working fluid 72, 72' from the cylinder 50.

Figure 4:
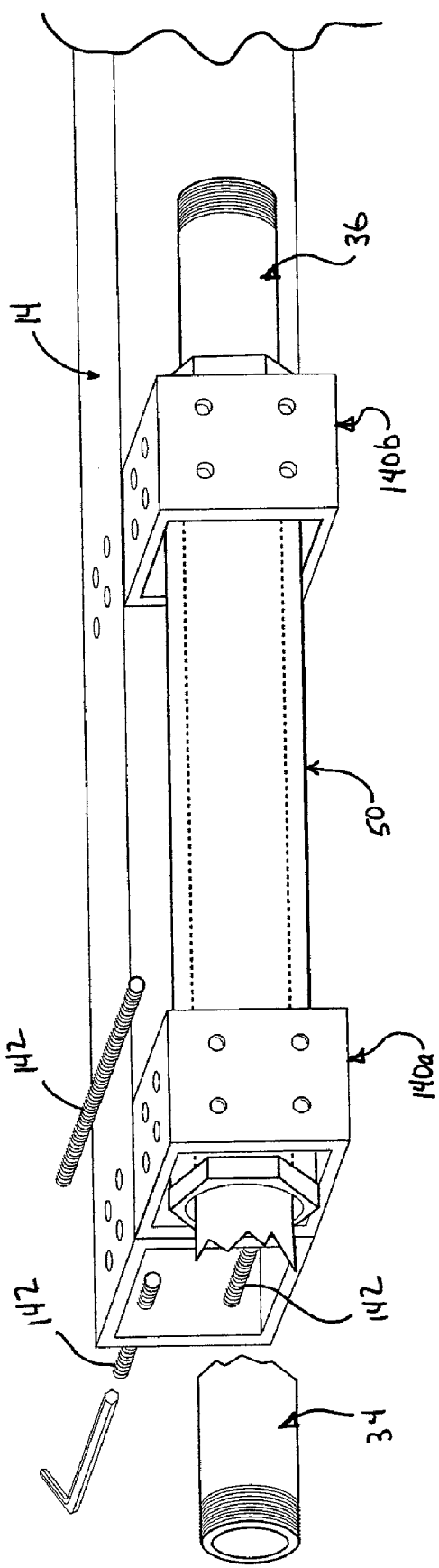
FIG. 4 is a perspective view of the piston/cylinder assembly of FIG. 3A mounted to a vehicle frame.

Finally, the trailing end 122 of the piston 34 extends coaxially from the first open end 112 of the cylinder 50. In some embodiments, the trailing end 122 is adapted for coupling to the drivetrain 24 (FIG. 1), for example, by forming exterior threads 134. The second piston 36 can be similarly constructed. Relative to mounting of the pistons 34, 36/cylinder 50 assembly to the vehicle 12, FIG. 4 illustrates one exemplary embodiment whereby the cylinder 50 is rigidly maintained by brackets 140a, 140b that are otherwise assembled to, or provided as part of, the vehicle's frame 14. The cylinder 50 can further be secured within the brackets 140a, 140b by appropriate coupling device(s), such as screws or pins 142. Regardless, the cylinder 50 is held stationary relative to the frame 14, and thus will not move with movement of the pistons 34, 36. Alternatively, a wide variety of other mounting techniques can be employed.

Figure 5:
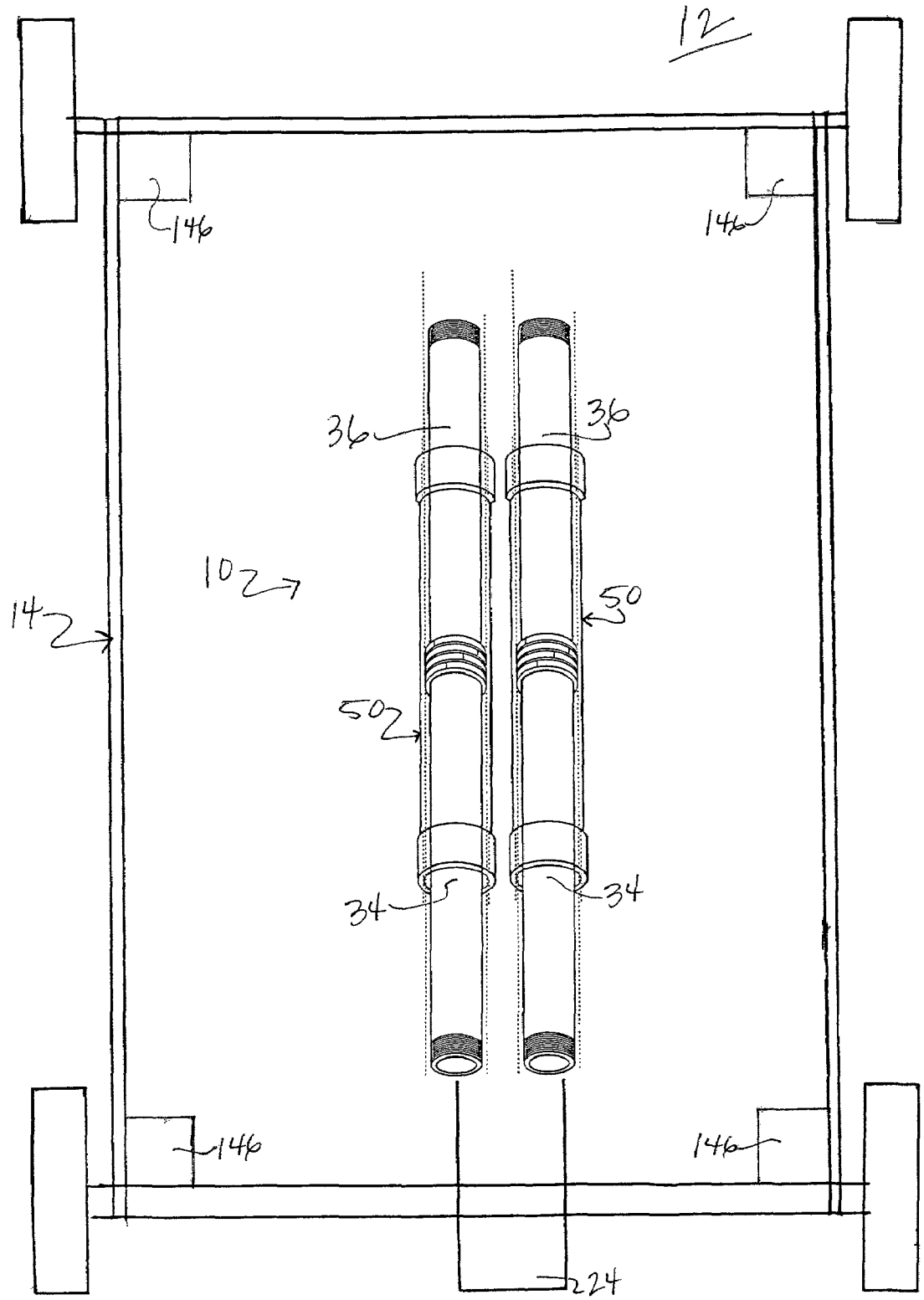
FIG. 5 schematically illustrates two of the piston/cylinder assemblies of FIG. 3A mounted to a vehicle.

FIG. 5 illustrates in highly simplified form two of the pistons 34, 36/cylinder 50 assemblies (in exploded form) mounted within the vehicle 12 and connected to the drive train 24. Pressurized fluid tanks 146 are dispersed at appropriate locations about the frame 14 so as to not interfere with other components or desired operation of the vehicle 12. Regardless, the fluid tanks 146 serve as the fluid input reservoir for powering the pistons 34, 36 as described below.

During use, and with reference to FIGS. 1 and 2, fluid(s) (i.e., the first fluid 70) within the common chamber 52 is pressurized to a desired level (e.g., on the order of 100-3,000 psi). This pressurized fluid 70 is, in turn, communicated to the first and second canisters 54, 56 that are otherwise fluidly connected to the common chamber 52. When a user (not shown) desires to move or propel the vehicle 12, operation of the power system 10 is initiated, for example by the user actuating a pedal or switch (e.g., a pedal located within the vehicle 12 and otherwise akin to a conventional accelerator pedal). Actuation of the pedal, in turn, initiates fluid flow within one or both of the fluid circuits 58 and/or 60. In this regard, the pedal can be linked to the control electronics 28 that, in response, operate to open or otherwise change a state of one or more of the valves provided with the system (e.g., the valves 90a-90c, 98a-98c of the first fluid circuit 58). In this regard, and in some embodiments, one or more of the valves 90a-90c, 98a-98c can be solenoid valves that are powered open or closed via the battery 26. Alternatively, a wide variety of other techniques (mechanical, electrical, software, etc.) can be employed to effectuate operation of the power system 10, and in particular flow of the working fluid therein, in response to a user actuating a pedal or similar mechanism.

Regardless, once initiated, the working fluids 72, 72' flow in a desired fashion within the system 10 to effectuate forced movement of the pistons 34, 36 relative to the cylinder 50. For example, and with reference to FIG. 6 that otherwise depicts the system 10 of FIG. 2 along with arrows showing fluid flow directions, the power system 10 can operate by initiating flow of the working fluid 72 from the first canister outlet 66, through the first fluid circuit 58 (and in particular the primary channel 80 thereof), and into the cylinder 50 via the first inlet 86. The pressurized nature of the first canister 54 (e.g., provided by the pressurized or first fluid 70 in some embodiments) ensures that the working fluid 72 is forced into the cylinder 50, and exerts a force or pressure upon the head 124 associated with the first piston 34. As a point of reference, with the one embodiment of FIG. 6, the valve 98a associated with the overflow channel 82 is closed such that fluid flow occurs only from the first canister 54 to the cylinder inlet 86. The force or pressure created by the working fluid 72 that is otherwise forced into the cylinder 50 forces the first piston 34 to move within the central bore 110 of the cylinder 50 (e.g., rightward relative to the orientation of FIG. 6). Flow of the working fluid 72 within the first fluid circuit 58, as well as within the cylinder 50, is represented by arrows A in FIG. 6; similarly, the force exerted by the working fluid 72 upon the first piston head 124 is represented by arrows F.

Figure 6:
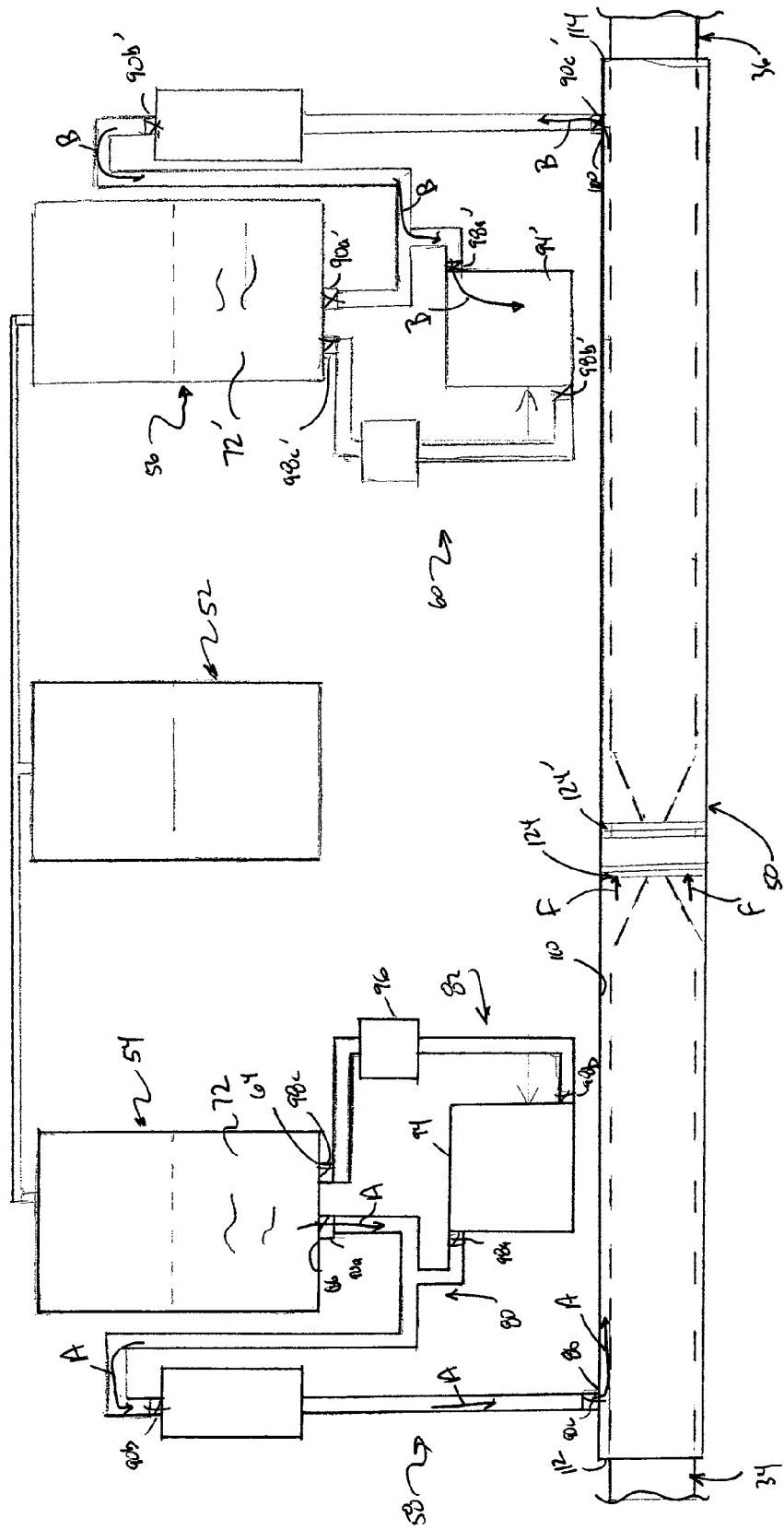
FIG. 6 is a schematic illustration of the power system of FIG. 2, showing fluid flow during use.

Simultaneous with forced movement of the first piston 34 (via interaction of the working fluid 72 with the first piston 34/cylinder 50 described above), the second piston 36 is forced in the same direction (i.e., rightward relative to the orientation of FIG. 6). To facilitate this desired movement, the second fluid circuit 60 is operated to release the working fluid 72' associated with the second piston 36/cylinder 50 into the overflow reservoir 94' associated therewith. In this regard, one or more of the valves 90a', 90c', 98a', and 98b' can be operated (e.g., via the controller electronics 28/battery 26 of FIG. 1) to complete this desired fluid flow path. With this one embodiment, then, the second fluid circuit 60 minimizes resistance to movement of the second piston 36 as the working fluid 72' associated therewith is not otherwise required to be forced back into the second canister 56 (that is otherwise under pressure). Instead, the excess working fluid 72' flows to the un-pressurized reservoir 94', as shown by arrows B in FIG. 6.

As the pistons 34, 36 near completion of a stroke relative to the cylinder 50 (i.e., rightward movement of the pistons 34, 36 relative to the cylinder 50 with the orientation of FIG. 6), the controller electronics 28/battery 26 (FIG. 1) operate to close one or more of the valves 90a-90c associated with the first fluid circuit 58, thus stopping the forced flow of the working fluid 72 into the first piston 34/cylinder 50 interface. To avoid excess wear on the system 10, in some embodiments the system 10 operates to stop movement of the pistons 34, 36 prior to the head 124' of the second piston 36 coming into contact with the sealing member 132' (FIG. 3B) associated with the second end 114 of the cylinder 50.

The system 10 then operates to reverse the above-described working fluid 72, 72' flow. More particularly, the working fluid 72' associated with the second canister 56/second circuit 60 is forced, under pressure, into the cylinder 50 via the second inlet 100 via desired opening or closing of one or more of the valves 90a'-90c', 98a'-98c'. Conversely, the valves 90a-90c, 98a-98c associated with the first fluid circuit 58 are operated to effectuate low resistance release of the working fluid 72 from the first piston 34/cylinder 50 interface. In particular, the working fluid 72 flows through the first inlet 86 and accumulates within the overflow reservoir 94. As a result, the first and second pistons 34, 36 move in an opposite direction (i.e., leftward relative to the orientation of FIG. 6).

The common chamber 52 ensures that a desired pressure is constantly maintained within the first and second canisters 54, 56 thus ensuring consistent, long-term operation of the power system 10. In other words, the system 10 can operate to move the pistons 34, 36 in a reciprocating back-and-forth motion over multiple strokes or cycles. From time to time, it may be necessary to essentially "replenish" the volume of working fluid 72, 72' within one or both of the first and second canisters 54, 56. For example and with specific reference to the first canister 54/first fluid circuit 58, in some embodiments, the control electronics 28/battery 26 (FIG. 1) periodically operate to close one or more of the valves 90a-90c and 98a, and open the valves 98b and 98c. In addition, the outflow pump 96 is then operated to force a volume of the working fluid 72, otherwise accumulated within the overflow reservoir 94, back into the first canister 54 via the refill inlet 64. A similar operation can be performed relative to the second canister 56/second fluid circuit 60. Alternatively, however, a wide variety of other techniques can be employed to replenish the supply of the working fluid within one or both of the canisters 54 and/or 56. In yet other embodiments, the overflow channel 82 can be eliminated from one or both of the fluid circuits 58 and/or 60; with this approach, flow of the working fluid 72 and/or 72' occurs directly between the cylinder 50 and the canister 54 or 56 in question with each movement or stroke of the pistons 34, 36. Further, while the system 10 has been described as including two of the pressurized canisters 54, 56 (and corresponding fluid flow circuits 58, 60) to provide equal power to the pistons 34, 36, in other embodiments, only a single one of the canisters 54 or 56 is provided. With this approach, the single canister 54 or 56 is fluidly connected to both of the cylinder inlets 86, 100.

As indicated above, the reciprocating movement of the pistons 34, 36 is used to power or cause movement of one or more of the vehicle's wheels 16a, 16b, 18a, and/or 18b (FIG. 1), for example via the drivetrain 24 (FIG. 1). Regardless, the relatively small gap 130 (FIG. 3B) established between the cylinder 50 the pistons 34, 36, and in particular the piston bodies 128, 128' associated therewith, dictates that only a small volume of the working fluid 72, 72' is required to flow during operation of the system 10, and can be readily pressurized to the extent necessary to effectuate a desired horsepower (e.g., the working fluid 72, 72' can be pressurized at a level of approximately 100 psi to achieve the horsepower necessary to propel a normally sized automotive vehicle at desired speeds, especially where two or more of the cylinders 50/piston pairs 34, 36 are provided). Further, in some embodiments, the power system 10 can be configured to effectuate or assist with vehicle braking in response to a user-initiated action (e.g., the user depressing a brake pedal or similar implement). For example, the system 10 can be operated to effectuate a reduction in the speed at which the pistons 34, 36 are moving back-and-forth and/or can cause the pistons 34, 36 to move in an opposite direction to that currently being experienced in response to pressing of the brake pedal. This operation can then serve to assist in braking the vehicle 12 (FIG. 1), and in some embodiments can be the sole braking mechanism.

The power system of the present disclosure provides a marked improvement over previous designs. The pneumatic over hydraulic vehicle power system described herein employs a unique, energy-efficient, double-ended hydraulic cylinder assembly. A variety of different fluids can be used (e.g., hydraulic oil provides lubricating, heat dissipating, and anti-foaming properties and thus is a useful fluid). To operate the vehicle, the user presses down on an accelerator pedal, causing fluid to be released from the air-charged pressure canister. This air pressure never leaves the power system, and only a small amount of fluid would be discharged into the non-pressurized canister with each stroke of the hydraulic cylinder assembly. As the operator accelerates, an electric clutch (or other device) engages an alternator, thus charging desired vehicle components, such as a battery, as well as a hydraulic pump that operates to return some of the fluid that was transferred to the non-pressurized canister. Other means for returning spent fluid are described above.

The system can propel virtually any sized vehicle, and does not require or entail the consumption of fossil fuels. Further, similar pistons/cylinder arrangements of a reduced scale can be included to power other components of the vehicle. For example, a smaller version of the pistons/cylinder assembly of FIG. 3B can be employed with the vehicle's air conditioning unit (not shown) to compress the refrigerant as described below, thus replacing conventional powering by the vehicle's motor. Even further, a separate system can be provided that allows the power system to operate the vehicle's heating and/or air conditioning system, or cause the vehicle to accelerate more quickly using higher pressures when the accelerator pedal is fully depressed. Based upon road conditions, the power system can be adapted to unload surplus compressed air (or other driving fluid) at the middle and/or bottom of steep hills. With this configuration, an air compressor can be provided and is engaged as an additional braking mechanism, and as an additional power source for propelling the vehicle. As a point of reference, the so-generated air pressure is not assisted by any other fluids, and is used in powering the heating and/or air conditioning systems and/or in propelling the vehicle. For example, the compressed air can be diverted to a secondary cylinder located inside of the main drive cylinder (e.g., the cylinder 50 of FIG. 3A). The secondary cylinder can thus be employed to provide the vehicle with additional horsepower when working with the fluid power system. Alternatively, the secondary cylinder could be used by itself until operating conditions of the vehicle no longer are self-creating surplus air (e.g., once the vehicle has stopped, has reached the bottom of a hill, etc.). With these and other configurations, the power system's overflow pump (e.g., the pump 96 of FIG. 2) would only operate when needed. Thus, where the overflow pump is battery-powered, the overflow pump would operate on a periodic basis, allowing the battery sufficient time to cool and re-charge, enabling reliable and continuous operation.

While the system has been described in the context of vehicles (e.g., automobiles, motorcycles, trucks, airplanes, submarines, etc.), the system 10 is equally applicable to powering of other devices or equipment that conventionally employ an internal combustion engine. For example, the system 10 can be employed with various robotic applications, such as a "walking" robot having legs, the movements of which are powered by the system described herein. With this but one alternative embodiment, the force or pressure generated as each leg "steps" or presses against a ground surface can be utilized to effectuate return or refilling of the working fluid to the pressurized canister.

Figure 7:
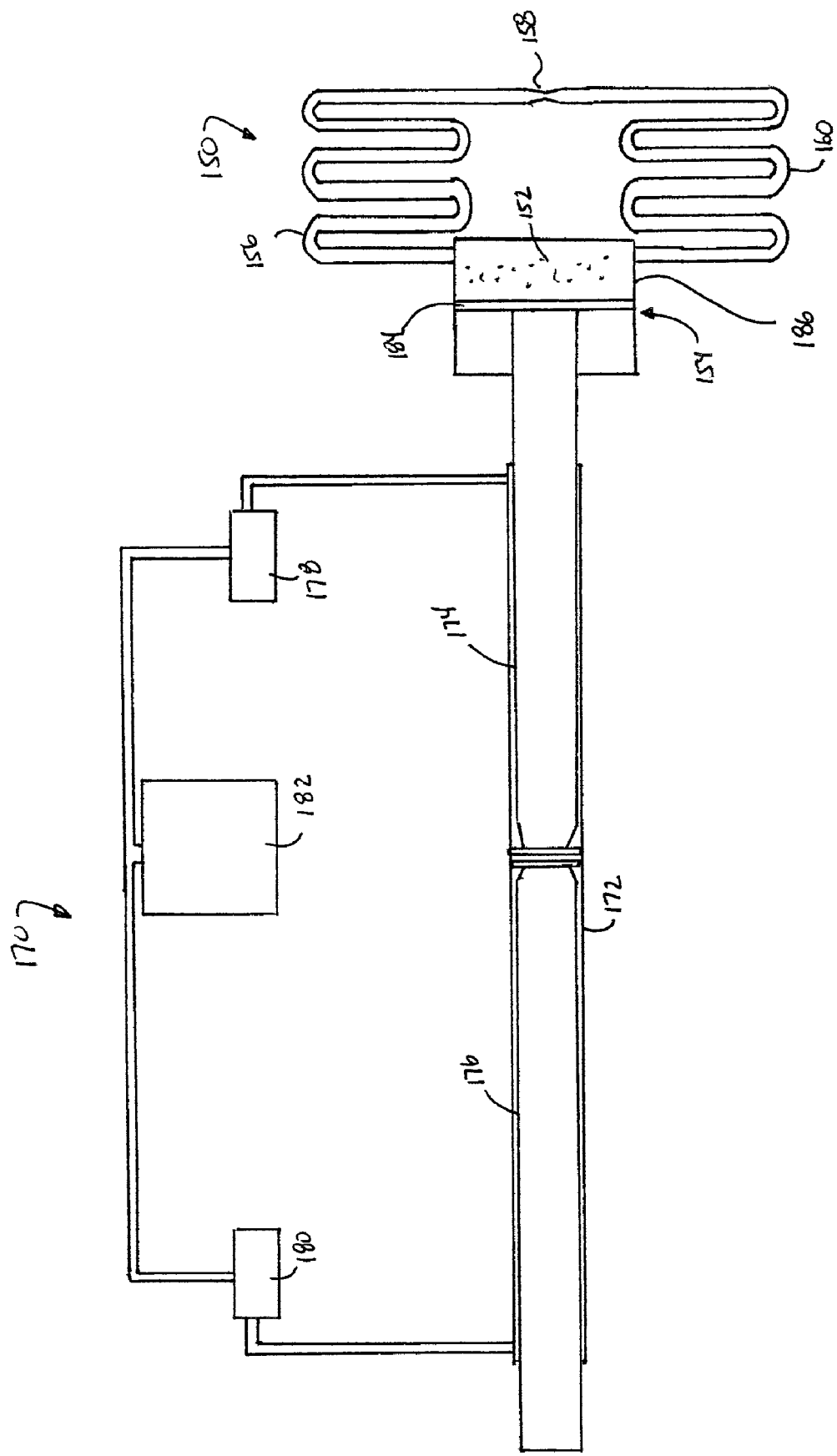
FIG. 7 is a schematic illustration of another power system in accordance with aspects of the present disclosure as applied to a compressed fluid-based device.

In addition to power vehicles, the power system in accordance with aspects of the present disclosure can be used as a replacement for an electric motor for a number of other motorized devices. For example, devices employing motorized compressor for generating compressed fluid during operation thereof (e.g., refrigerator, air conditioners, freezers, etc.) can be linked to the power system of the present disclosure, eliminating the need for an electric motor. In this regard, FIG. 7 is a schematic diagram of a device 150 configured to require compressed fluid during operation thereof. The device 150 can be any of a number of currently available implements; for purposes of explanation only, the device 150 is a refrigeration unit in which Freon (or other fluid) 152 is compressed at a compression station 154 (and experiences an increase in temperature), passes through an external heat exchange coil 156 (where the Freon 152 losses heat and condenses), then through a expansion valve 158 (causing the Freon 152 to expand, evaporate, and cool), and then through an internal heat exchange coil 160 along which the Freon 152 absorbs heat from the environment.

With the basic understanding of device 150 operation in mind, a power system 170 in accordance with aspects of the present disclosure is connected or linked to the device 150, and in particular the compression station 154. As a point of reference, with conventional compressed fluid device constructions, the compression station 154 is an electrically powered compressor. With the configuration of FIG. 7, however, the conventional compressor is effectively replaced by the power system 170. The power system 170 can assume any of the forms previously described above with respect to the power system 10 (FIGS. 1-6), and generally includes a common cylinder 172, first and second pistons 174, 176, a first fluid circuit 178 and a second fluid circuit 180. The pistons 174, 176 are akin to the cylinders 34, 36 (FIG. 2) previously described, and are arranged as a piston pair relative to the common cylinder 172 that is otherwise akin to the common cylinder 50 (FIG. 2) previously described. The fluid circuits 178, 180 can also take a wide variety of forms (e.g., can include the components associated with the fluid circuit 58 of FIG. 2), and are fluidly connected to a common fluid pressure chamber 182 (akin to the common fluid pressure chamber 52 of FIG. 2). In this regard, the power system 170 may further include pressurized chambers fluidly connecting the fluid circuits 178, 180 to the common fluid pressure chamber 182, respectively (as shown, for example, in FIG. 2).

Regardless of an exact configuration, the power system 170 utilizes compressed fluid (e.g., air) from the pressure chamber 182 to effectuate back-and-forth movement of the pistons 174, 176 relative to the cylinder 172 as previously described. In this regard, the first piston 174 is mechanically connected to a compression head 184 within a housing 186 of the compression station 154. The compression station 154 can further include appropriate valve(s) to control desired containment and release of the Freon 152 from the housing 186. With this construction, then, back-and-forth movement of the first piston 174 translates into back-and-forth movement of the compression head 184 that in turn compresses the Freon 152 within the compression station 154 in a manner similar to operation of a conventional, electrical motor-powered compressor. Unlike conventional compressor, however, an electrical motor otherwise driving the compression head 184 is required. Instead, the power source 170 makes utilizes compressed air as the source of energy.

Although the arrangement of FIG. 7 depicts only the first piston 174 as acting upon the device 150, in other embodiments, movement of the second piston 176 can also be linked to the device 150. For example, a second compression station can be fluidly connected to the coil(s) 156 and/or 160 for assisting in compressing of the Freon 152 as needed. Alternatively, the second piston 176 can be linked to a separate, compressed fluid-based device (not shown), and in particular a compression station thereof, operating upon the second device in a fashion similar to operation of the first piston 174 relative to the device 150 as described above. A number of virtually limitless other applications are equally applicable.

In addition to serving as a replacement for an electric motor of a compressed fluid-based device, the power system 170 can also be used to provide power for a number of other devices. For example, but in no way limiting, the power system 170 (and in particular one or both of the pistons 174 and/or 176) can be mechanically linked to a power generator adapted to convert mechanical movement into electrical energy. The power generator, in turn, can be used to power a number of different devices, ranging from common household appliances (e.g., hair dryer, toaster, etc.), to a heating element associated with a heating device (e.g., hot water heater, furnace, etc.). In fact, the combination power generator/heating device can be used to heat an entire home (e.g., via baseboard ductwork system). Alternatively or in addition, movement of the piston(s) 174, 176 can be used to power a battery charger, that in turns re-charges a corresponding battery (either alone or in combination with other devices such as a solar panel). The battery, in turn, can be used to power any number of devices.

In yet other embodiments, the power source 170 can be used in a similar manner to compress a wide variety of other fluids other than Freon (e.g., water, air, etc.). Along these same lines, the power source 170 can be configured such that the fluid being compressed is fluidly connected to an interior of one or both of the hollow pistons 174 and/or 176, such that the fluid being compressed can flow into one or both of the pistons 174 and/or 176 to be further acted upon (e.g., compressed). Effectively, then, the piston(s) 174, 176 are externally "powered" (via compressed air between the cylinder 172 and the pistons 174, 176 as previously described) and internally effectuate fluid compression (e.g., the inside of the hollow piston(s) 174, 176 serves as a compressed air jug). In even further embodiments, an interior of the hollow pistons 174, 176 and/or an interior of the cylinder 170 can include a plurality of electrical probes; back-and-forth movement of the pistons 174, 176 interacts with the probes to generate electricity.

Figure 8:
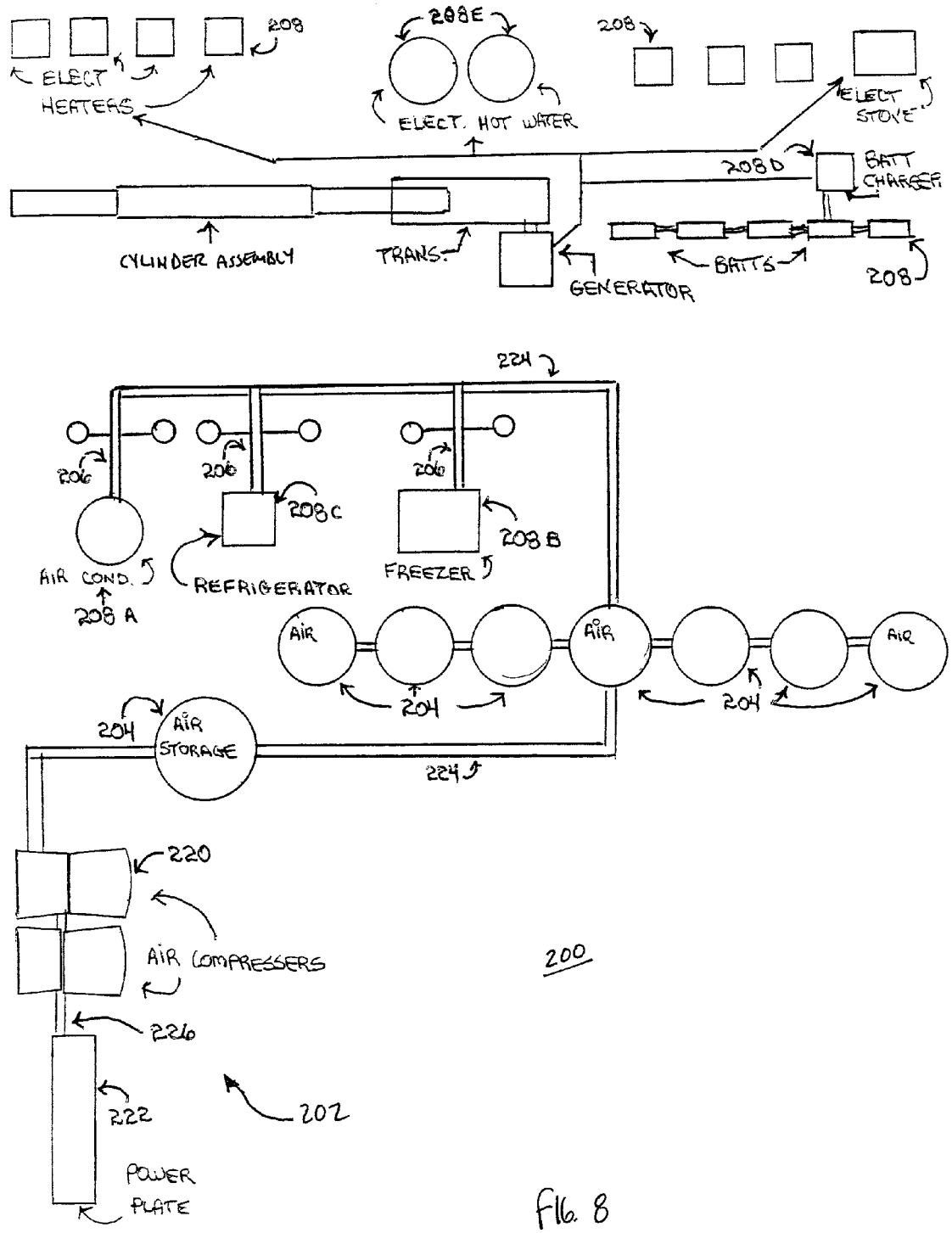
FIG. 8 is a schematic illustration of another power system in accordance with aspects of the present disclosure.

In light of the above application of the power system as a replacement for electrical motors, in yet other embodiments, the power system in accordance with aspects of the present disclosure is used to power multiple devices (e.g., appliances) for one, preferably multiple, installations (e.g., homes), using a readily available, "free" source of energy generated by vehicles traveling on a roadway. With this in mind, FIG. 8 illustrates, in schematic form, another embodiment power system 200. The system 200 includes a primary drive system 202, one or more pressurized input stations 204, one or more secondary power systems 206, and one or more powered devices 208. Details on the various components are provided below. In general terms, however, the primary drive system 202 operates to delivery a pressurized fluid to each of the pressurized input stations 204. One or more of the secondary power systems 206 are fluidly connected to a corresponding one of the pressurized input stations 204. Similarly, one or more of the powered devices 208 make use of compressed fluid from, or are powered by, operation of a corresponding one of the secondary power systems 206. As described below, the powered devices 208 can assume a wide variety of forms, and can include common, household devices utilizing compressed fluid such as an air conditioner (208a), a freezer (208b), a refrigerator (208c), etc. Further or alternatively, the powered device 208 can be or include a battery charger (208d) that in turn electrically charges a battery otherwise serving to power a corresponding device (e.g., a hot water heater 208e), etc.

As a point of reference, two or more of the secondary power systems 206 can be acted upon or driven by a single one of the pressurized input stations 204; alternatively, each of the secondary power systems 206 can be fluidly connected to a single, dedicated pressurized input station 204. Further, a single one of the pressurized input stations 204 can fluidly drive two or more of the secondary power systems 206. Regardless, the system 200 can be uniquely configured such that not only can multiple devices 208 be fluidly driven at a single location, but also multiple locations can be similarly served. That is to say, the system 200 can be used to power or operate one or more devices 208 located at two or more places of residence (e.g., a first residence can have one, two, or more dedicated pressurized input stations 204 operating upon one, two, or more powered devices 208; a second residence also includes one, two, or more dedicated pressurized input stations 204 operating upon one, two, or more powered devices 208; etc.), all commonly connected to the primary drive system 202.

Given the above context of the system 200 in which multiple motorized equipment at multiple locations are all acted upon or powered by the common primary drive system 202, in some optional embodiments, the primary drive system 202 is adapted to be highly robust, utilizing a readily available force or energy, in particular vehicles traveling over a roadway, for creating a virtually endless supply of pressurized fluid. As such, in some embodiments, the primary drive system 202 further includes a compressor 220 and a drive shaft actuating assembly 222. In general terms, the compressor 220 provides compressed fluid to the pressurized input station(s) 204, for example via one or more conduits 224. The drive shaft actuating assembly 222, in turn, provides a mechanical input to the compressor 220 for generating the compressed fluid.

With embodiments in which the primary drive system 202 is employed to provide pressurized fluid to a relatively large number of pressurized input stations 204, the compressor 220 is fairly large, capable of generating pressures of at least 250 psig. Further, the compressor 220 is highly rugged, amenable for outdoor use under various environmental conditions (e.g., low or high temperatures, low or high humidity, etc.). In some embodiments, then, the compressor 220 is a double-acting reciprocating compressor having a single or multi-stage design, for example, compressors available from Ingersoll-Rand under the tradename "PHE" compressor. Several PHE compressor models are non-lubricated, and thus capable of generating compressed, oil-free air. Alternatively, however, a lubricated compressor can also be employed. Regardless, and in general terms, the compressor 220 includes conventional components such as a cylinder and a piston, with movement of the piston relative to the cylinder compressing a contained fluid. A drive shaft 226 operates to effectuate reciprocating movement of the piston (directly, through an appropriate linkage assembly, etc.). In this regard, unlike conventional compressor designs in which a separate motor (e.g., an electric motor) drives movement of the drive shaft 226, with the system 200, the drive shaft actuating assembly 222 is employed.

Figure 9:
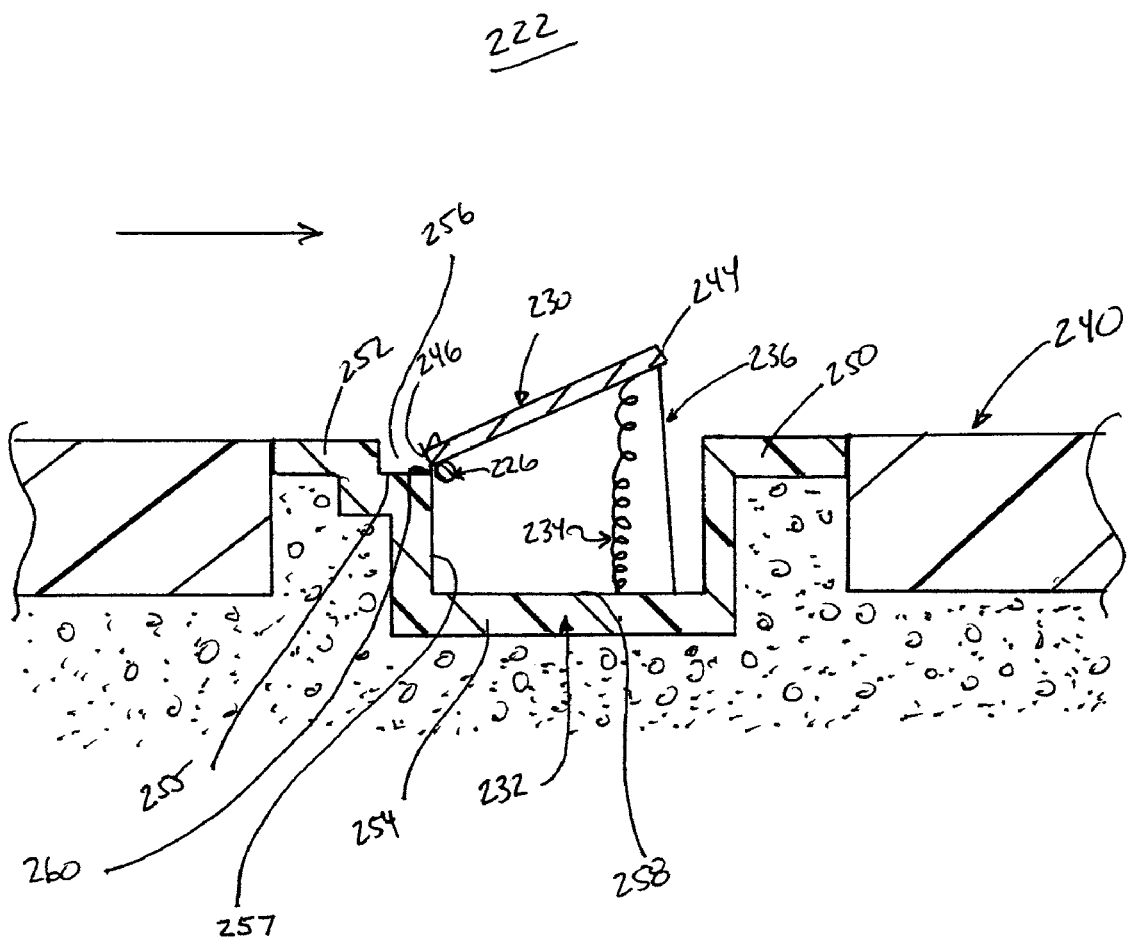
FIG. 9 is a simplified side view of an actuating assembly useful with the system of FIG. 8.

With the above understanding of the compressor 220 in mind, in some embodiments, the drive shaft actuating assembly 222 is configured for mechanical actuation, and in particular via an external force generated by vehicles moving along a roadway. In general terms, the drive shaft actuating mechanism 222 can be physically located on a vehicle roadway (e.g., freeway, highway, street, etc.). With additional reference to FIG. 9, in some embodiments, the drive shaft actuating assembly 222 includes a plate 230, a channel body 232, a biasing means 234, and a securing means 236. The plate 230 is pivotally connected to the channel body 232, and is further affixed to the drive shaft 226 (or a separate shaft that in turn is connected to the drive shaft 226). Thus, pivoting movement of the plate 230 relative to the channel body 232 imparts a rotational moment force onto the drive shaft 226. The biasing means 234 biases the plate 230 to a raised orientation relative to the channel body 232 (as shown in FIG. 9). Conversely, the securing means 236 prevents overt rotation of the plate 230 relative to the channel body 232 (e.g., prevents the plate 230 from rotating counterclockwise "beyond" the raised orientation of FIG. 9). With this configuration, then, as the wheels of a vehicle (not shown) travel over the plate 230 (in the direction shown by an arrow in FIG. 9), a weight of the vehicle imparts a force onto the plate 230 sufficient to overcome the force of the biasing means 234, thus causing the plate 230 to pivot relative to the channel body 232 (clockwise relative to the orientation of FIG. 9). This movement is translated to the drive shaft 226 that in turn operates the compressor 220 to compress a contained fluid. Once the vehicle-induced force is removed from the plate 230, the biasing means 234 forces the plate 230 to rotate or pivot back to the initial or raised position, rotating the drive shaft 226 in an opposite rotational direction. With this configuration, then, a readily available, yet currently unused, source of energy (e.g., vehicles traversing a roadway) is used to drive the system 200.

Figure 10:
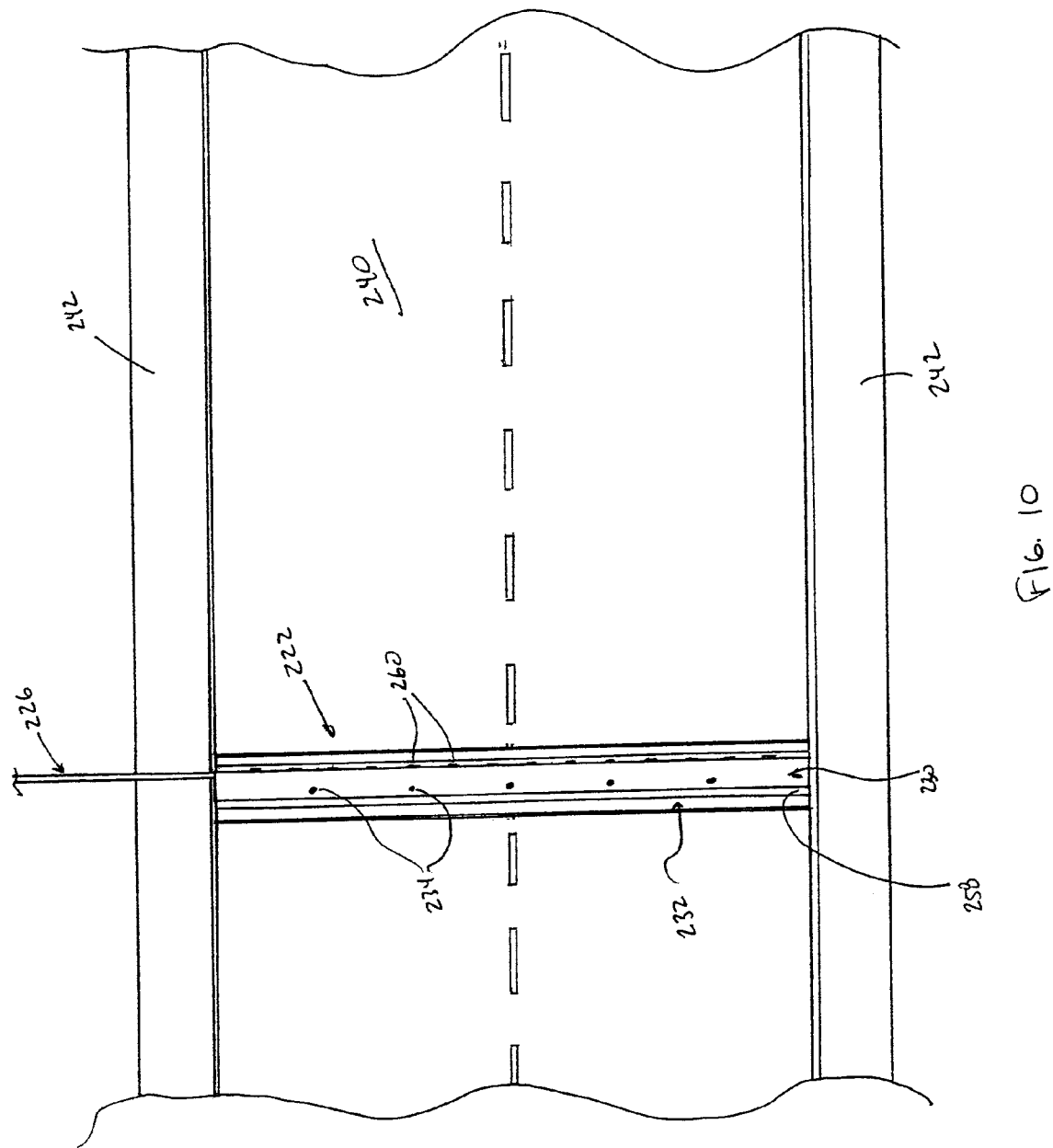
FIG. 10 is a simplified, front cross-sectional view of the actuating assembly of FIG. 9.

The plate 230 can assume a variety of forms, and preferably has a rugged, reinforced construction (e.g., stainless steel, ceramic, etc.). While a width of the plate 230 can be relatively small (on the order of 2-10 inches in some embodiments), a length of the plate 230 is preferably commensurate with a width of the roadway to which it is applied. For example, FIG. 10 illustrates a roadway 240 in simplified form. Where the roadway 240 is a relatively wide freeway (e.g., two or more driving lanes), the plate 230 preferably extends between shoulders 242 of the roadway 240, and thus can have a length on the order of 15 feet. In other embodiments, however, the plate 230 can have either a greater or lesser length and need not necessarily extend from shoulder-to-shoulder of the roadway 240. For example, with a two lane roadway 240, two of the plates 230 can be provided, each sized to extend across a single lane. Regardless, and returning to FIG. 8, the plate 230 defines a leading side 244 and a trailing side 246.

Figure 11:
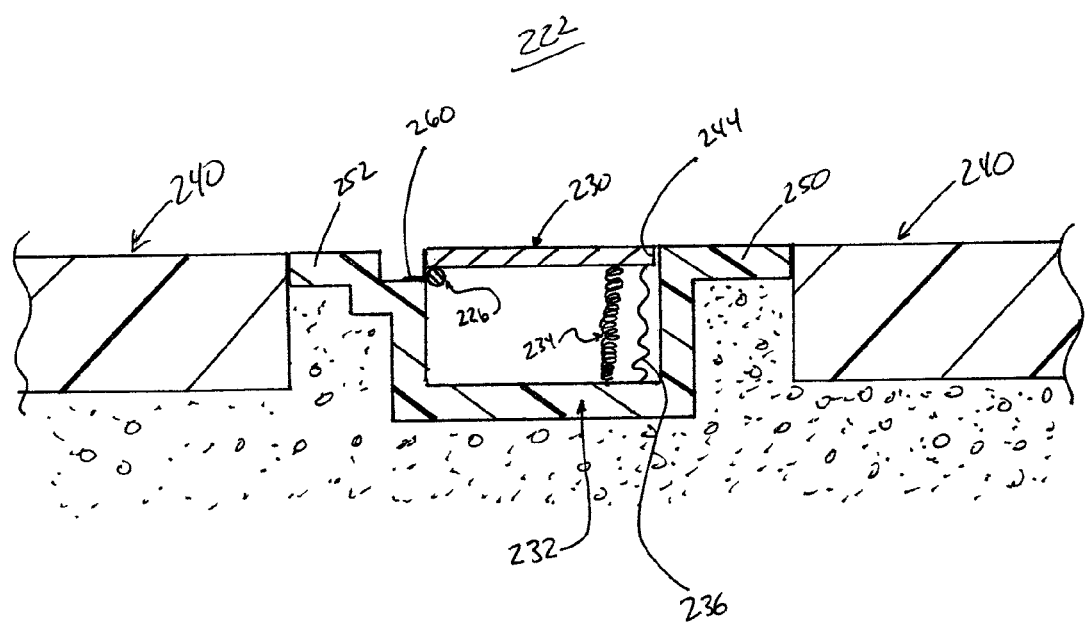
FIG. 11 is a simplified, side view of the actuating assembly of FIG. 9 in a lowered position.

The channel body 232 is configured for mounting or placement relative to the roadway 240, and can generally include or define a leading segment 250, a trailing segment 252, and an intermediate segment 254. The leading segment 250 is generally linear to establish a substantially contiguous surface relative to the roadway 240 as described below. The trailing segment 252 is also relatively linear, and forms a shoulder 255 having a height relative to the intermediate segment 254 that is less than a height defined by the leading segment 250. With this configuration, then, upon final assembly to the roadway 240, a gap 256 is established of sufficient size to provide for clearance of the plate 230/drive shaft 226 assembly, as well as rotational or pivoting movement thereof. More particularly, the trailing segment 252 is preferably configured such that with downward rotation of the plate 230, a substantially contiguous surface is established between the roadway 240, the trailing segment 252, the plate 230, and the leading segment 250, as shown in the "lowered" orientation of FIG. 11.

Finally, the intermediate segment 254 establishes a channel 257 sized for receiving the biasing means 234 and the securing means 236. In this regard, the intermediate segment 254 includes a base wall 258 to which the biasing means 234 and the securing means 236 are secured and supported.

Given the above general constraints, the channel body 232 can assume a variety of shapes and/or sizes, commensurate with dimensions of the plate 230. Further, the channel body 232 can be formed from a number of rugged materials (e.g., stainless steel, ceramics, etc.). Preferably, the material(s) selected for the channel body 232 will maintain a structural integrity of the channel body 232 under harsh environment conditions, and can include one or more features that facilitate removal of contaminants from within the channel 256. For example, and with additional reference to FIG. 10, the channel body 232, and in particular the base wall 258 of the intermediate segment 254 can define a slope (i.e., change in spatial height) in extension between the shoulders 242. With this configuration, debris (e.g., dirt, rocks, road salt, trash, etc.) accumulating within the channel 257 is readily moved to one edge of the channel body 232 in the presence of water (e.g., as part of a cleaning operation, rain, melting snow, etc.). The so-dispensed debris can then be stored in a collection/drainage tank (not shown), or simply allowed to drain into the environment.

Returning to FIG. 9, the biasing means 234 is adapted to exert a relatively consistent force onto the plate 230 over an extended period of time, and will maintain its integrity (or spring force) when subjected to numerous compressive cycles. In some embodiments, the biasing means 234 is a compression spring attached to the base wall 258 of the channel body 232 and to the plate 230 adjacent the leading side 244. With embodiments in which the plate 230 has a relatively large length, the drive shaft actuating mechanism 222 can include a plurality of the biasing means 234 as shown in FIG. 10. Regardless, the biasing means 234 is formed of a rugged material, able to maintain its structural integrity under relatively harsh environment conditions. In this regard, additional components can be included to better ensure long term functioning of the biasing means 234 (e.g., a protective sleeve can be disposed about the spring to prevent debris from interfering with desired compression/extension thereof). Notably, the biasing means 234 is not limited to a compression spring, and thus can assume a number of other forms capable of biasing the plate 230 to the raised position.

The securing means 236 is relatively flexible, yet exhibits an appropriate tensile modules (e.g., limited elongation or stretch) to consistently prevent the plate 230 from overtly rotating beyond a desired position relative to the channel body 232 in response to a force of the biasing means 234. Further, the securing means 236 is formed of a rugged material, able to withstand relatively harsh environmental conditions. Thus, for example, in some embodiments, the securing means 236 is a flexible wire or filament, able to readily deform with rotation of the plate 230 (i.e., the lowered arrangement of FIG. 11), yet exhibits limited stretching or elongation in the raised position (FIG. 9). Regardless, the securing means 236 preferably extends between the base wall 258 of the channel body 232 and the leading end 244 of the plate 230. Alternatively, the securing means 236 can assume a variety of other forms different from that shown (e.g., an interface between the trailing side 246 of the plate 230 and the trailing segment 252 of the channel body 232 can include a stop surface that impedes rotation/pivoting of the plate 232 "beyond" the raised position of FIG. 9). Similar to the biasing means 234, in some embodiments, a plurality of the securing means can be provided.

Assembly of the drive shaft actuating assembly 222 relative to the roadway 240 can include first excavating a sufficient volume of earth/roadway materials for placement of the channel body 232. Once again, the channel body 232 is positioned, in some embodiments, such that the leading segment 250 is substantially contiguous with a corresponding surface of the roadway 240 as shown in FIG. 9. The plate 230 is pivotally mounted to the channel body 232, and in particular such that the trailing side 246 of the plate 230 pivots relative to the trailing segment 252 of the channel body 232. In some embodiments, one or more hinges 260 are employed to establish this pivotable assembly. The drive shaft 226 (or other shaft body that is connected to the drive shaft 226) is affixed to the plate 230 adjacent the trailing side 246. In this regard, a variety of coupling techniques can be employed (e.g., brackets, fastening members, adhesives, etc.). In more general terms, any assembly technique that substantially ensures a non-moving relationship of the plate 230 relative to the drive shaft 226 for long periods of time under relatively harsh environmental conditions is appropriate. Along these same lines, assembly of the plate 230/drive shaft 226 relative to the channel body 232 is such that a pivot point of plate 230 rotation is in close proximity to a central axis of the drive shaft 226 to minimize a radial movement of the drive shaft 226 with rotation of the plate 230. In fact, in other embodiments, the drive shaft 226 is directly coupled or journaled to the channel body 232 such that the central axis of the drive shaft 226 serves as the pivot point.

Figure 12:
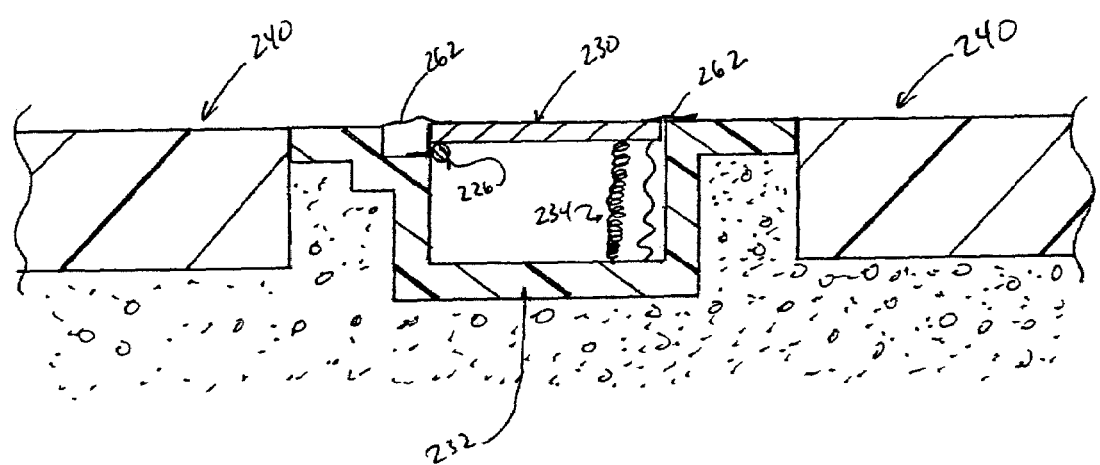
FIG. 12 is a simplified, side view of another embodiment actuating assembly.

Finally, the one or more biasing means 234 and the one or more securing means 236 are interconnected between the base wall 258 and the plate 230, preferably adjacent the leading side 244 thereof. It will be understood that with different formats of the biasing means 234 and/or the securing means 236, assembly thereof to the plate 230 and/or channel body 232 may differ from that described. Also, the drive shaft actuating assembly 222 can include additional features that enhance long term functioning. For example, and with reference to FIG. 12, one or both of rear and/or forward flaps 262 can be provided that impede introduction of debris into the channel body 232 and/or the plate 230/channel body 232 interface. The flaps 262 can assume a variety of forms, and can, for example, be flexible materials or membranes affixed to the plate 230.

With reference to FIG. 8, the compressor 220 is preferably located in relatively close proximity to the drive shaft actuating assembly 222 so as to minimize an overall length of the drive shaft 226. Thus, in some embodiments, the compressor 220 is physically located adjacent the roadway 244 (FIG. 10), either above or below ground. The conduit 224 from the compressor 220 (otherwise conveying pressurized fluid) can then have any desired length, and can be buried or located above ground.

Returning to FIGS. 9-11, following the drive shaft actuating assembly 222 is available for converting energy or forces from vehicles traversing the roadway 240 into repeated rotational movement of the drive shaft 226. For example, in the absence of a vehicle along the roadway 240 in close proximity to the drive shaft actuating assembly 222, the biasing means 234 forces the plate 230 to the raised position of FIG. 9 in which the leading side 244 is raised relative to the roadway 240. As a point of reference, in some embodiments, in the raised position, the leading side 244 is elevated above a surface of the adjacent roadway 240 by a height of approximately 2 inches, however, other dimensions are equally acceptable. As a vehicle's wheels (not shown) travel over the plate 230, a weight of the vehicle exerts a force onto the plate 230 sufficient to overcome a force of the biasing means 234. As a result, the plate 230 pivots or rotates from the raised orientation of FIG. 9 to the lowered orientation of FIG. 11. Where desired, the channel body 232 can further include a catch or stop member that prevents rotation of the plate 230 beyond (clockwise relative to the orientation of FIG. 11) a desired lowered orientation in which the plate 230 is substantially contiguous with the leading segment 250 of the channel body 232, and thus of the roadway 240. Regardless, movement of the plate 230 is translated onto the drive shaft 226 (e.g., the drive shaft 226 rotates approximately ¼-1/20 revolution). As soon as the vehicle's wheels are beyond the plate 230, the biasing means 234 forces the plate 230 back to the raised position (i.e., transitions the plate 230 from the lowered position of FIG. 11 to the raised position of FIG. 9). This movement is again translated to the drive shaft 226.

In light of the above, where the drive shaft actuating assembly 222 is located on a heavily traveled roadway, the plate 230, and thus the drive shaft 226, will experience a large number of back-and-forth rotational movements as a multitude of vehicles (each having two or more wheel axles) travel over the plate 230.

Returning to FIG. 8, the repeated back-and-forth rotation of the drive shaft 226 (via the drive shaft actuating assembly 222) serves to drive the compressor 220 (either directly or by an appropriate linkage/gear assembly that translates rotational movement to linear movement). The compressor 220, in turn, delivers pressurized fluid to the pressurized input stations 204 as described above. As a point of reference, where the system 200 is employed to deliver pressurized fluid/power to multiple locations (e.g., multiple homes), two or more of the primary drive systems 202 can be provided and fluidly interconnected to the pressurized input stations 204. Regardless, the pressurized input stations 204 deliver or provide a constant source of pressurized fluid to one or more of the secondary power systems 206.

In some embodiments, the pressurized power systems 206 are akin to the power systems 10 (FIG. 2), 170 (FIG. 7) described above. Thus, for example, the secondary power systems 206 each include the reciprocating piston 34, 36/cylinder 50 (FIG. 2) arrangement described above, with the pressurized input station 204 serving to force fluid from the overflow reservoir 94 where desired (e.g., akin to an overflow pump). Alternatively, the pressurized input stations 204 can serve as the pressurized fluid circuit canister 54 described above, or as the common pressure chamber 52 described above. Even further, one or more of the secondary power system(s) 206 can be an integral component of the power device 208 in question, retro-fitted to operate using pressurized fluid from a corresponding one of the pressurized input stations 204. For example, the power device 208 can be an air conditioner that requires pressurized flow of Freon. Under these circumstances, the compressor/drive motor associated with a conventional air conditioning unit can be replaced/retro-fitted with an assembly that utilizes pressure from the pressurized input station 204 to pressurize the Freon, as described above with respect to FIG. 5. Regardless, the secondary power systems 206 are each sized and adapted to provide necessary power to the corresponding powered device 208. In this regard, the secondary power system 206 can be directly connected to the powered device 208 in question, or can be employed to recharge a battery that in turn powers the powered device 208 in question.

In some embodiments, overall efficiency of the system 200 can be further enhanced by "re-using" air exhausted or expelled from one or more of the powered devices 208 (e.g., air exhausted from a particular one of the powered devices 208 can be fluidly forced back to the corresponding secondary power system 206 and/or one of the pressurized input stations 204). Under these circumstances, the various components of the power system 200 are configured to be capable of operating with contaminated (e.g., oily air).

Figure 13:
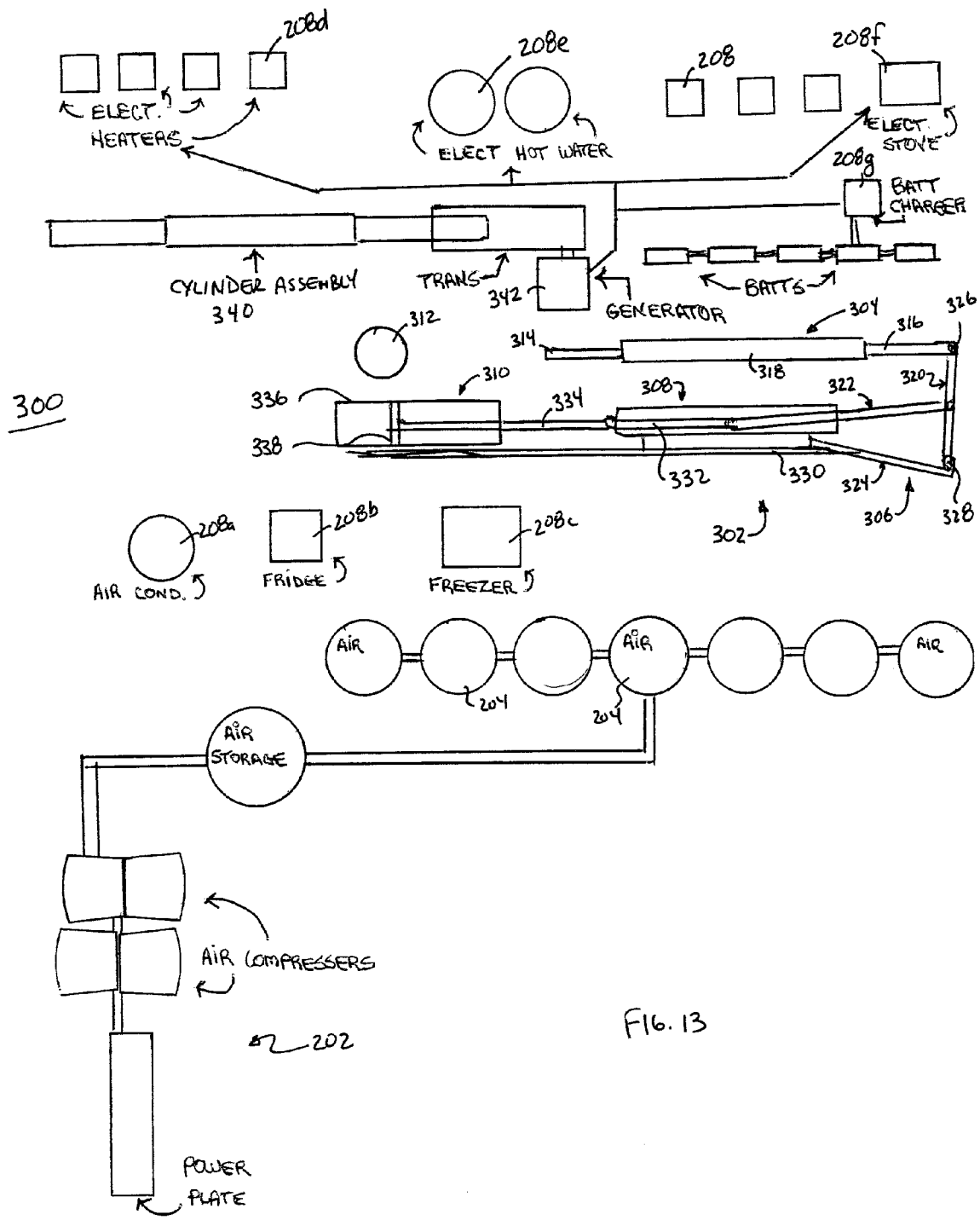
FIG. 13 is a schematic illustration of another power system in accordance with aspects of the present disclosure.

FIG. 13 illustrates an alternative embodiment system 300 akin to the system 200 of FIG. 8. The system 300 includes the primary drive system 202, the one or more pressurized input stations 204, and the one or more powered devices 208 one or more of which include a dual piston/cylinder arrangement (not shown, but akin to the pistons 34, 36/cylinder 50 of FIG. 3A). In addition, the system 300 includes an intermediate drive system 302 that regulates delivery of pressure/force from one of the pressurized input stations 204 to the one or more powered devices 208.

The intermediate drive system 302 includes, in some embodiments, a double-ended (or dual-piston) hydraulic cylinder assembly 304, a linkage 306, a linear motion device 308, a cylinder assembly 310, and a recirculation or spent fluid tank 312. The hydraulic cylinder assembly 304 is configured in accordance with the embodiments previously described and includes pistons 314, 316 and a cylinder 318 (e.g., akin to the pistons 34, 36/cylinder 50 of FIG. 3A). The cylinder assembly 304 is fluidly connected to one of the pressurized input stations 204 via conduits or tubing (not shown). Thus, movement of the pistons 314, 316 relative to the cylinder 318 is driven by pressurized fluid (e.g., air) from the selected station 204.

The piston 316 is connected to the linkage 306. In this regard, the linkage 306 includes a first bar 320, a second bar 322, and a third bar 324. The piston 316 is pivotably linked to a first end 326 of the first bar 320, whereas the third bar 324 is pivotably linked to the first bar 320 at an opposing, second end 328. The second bar 322 is pivotably linked to the first bar 320 intermediate the piston 316 and the third bar 324. Further, the second bar 322 extends from the first bar 320 and is connected to the linear motion device 308, whereas the third bar 324 is affixed to a stationary body 330. With this construction, reciprocating movement of the piston 316 is translated onto the first bar 320; in response, the first bar 320 moves, pivoting at the second end 328 due to the spatially fixed position of the third bar 324. The second bar 322 moves with the first bar 320, with this motion being translated at the linear motion device 308 as described below.

The linear motion device 308 can assume a variety of forms, and is generally configured to translate the non-linear motion of the second bar 322 into a linear motion at link 332. Link 332, in turn, is connected to a piston 334 of the cylinder assembly 310 that further includes a cylinder 336 and a working fluid (not shown). The piston 334 acts upon the working fluid, creating pressure within the cylinder 336, within the pressurized fluid being delivered to the powered devices 208 (and any corresponding dual-headed cylinder assemblies) as described above, via conduits/tubing (not shown). Spent fluid from the working devices 208 is delivered to the recirculation tank 312 via conduits/tubing (not shown), and re-introduced into the cylinder 336 (at an opposite side of the piston head 338).

During use, pressurized fluid from the station 204 drives the intermediate drive system 302, that in turn drives the linkage 306. Resultant movement of the second bar 322 is applied as a power input to the cylinder assembly 310. With this approach, fluid from the input station 204 does not directly interact with the powered devices 208, such that a fluid other than "clean" air can be stored at the input stations 204. Finally, the powered devices 208 can assume any of the forms described above. Thus, for example, pressurized fluid from the cylinder assembly 310 can be used to effectuate compression of a cooling medium at an air conditioner 208a, a refrigerator 208b, a freezer 208c, etc. Also, the cylinder assembly 310 can serve as an input to a secondary power supply 340 (akin to the pistons 34, 36/cylinder 50 previously described) that in turn powers a generator 342. Alternatively, the secondary power supply 340 is fluidly powered by one of the input stations 204. The generator 342 provides power to, amongst other optional devices, an electric heater 208d, an electric hot water heater 208e, an electric stove 208f, a battery charger 208g, etc.

Although the present disclosure has been described with reference to preferred embodiments, workers skilled in the art will recognize that changes can be made in form and detail without departing from the spirit and scope of the present disclosure.

What is claimed is:

1. A power system for a vehicle drivetrain comprising:
   a cylinder defining a central bore extending between first and second open ends, the cylinder forming a first inlet adjacent the first open end and a second inlet adjacent the second open end;
   first and second pistons coaxially disposed within the central bore, each of the pistons including:
      a leading end terminating at a head that is movably sealed within the central bore,
      a trailing end extending from the corresponding open end of the cylinder and adapted for coupling to the vehicle drivetrain,
      a piston body extending between the leading and trailing ends and defining an outer diameter,
      wherein the outer diameter of the piston body is at least 75% of a diameter of the central bore; and
   a common pressure source in fluid communication with each of the first and second inlets;
   wherein forced flow of working fluid into the first inlet in conjunction with release of working fluid from the second inlet effectuates movement of the pistons in a first direction, and forced flow of working fluid into the second inlet and release of working fluid from the first inlet effectuates movement of the pistons in an opposite, second direction.

2. The power system of claim 1, wherein the outer diameter of the central body is at least 90% of the diameter of the central bore.

3. The power system of claim 1, further comprising:
   a first sealing member sealing the first piston within the cylinder; and
   a second sealing member sealing the second piston within the cylinder;
   wherein the first and second sealing members are adjacent one another.

4. The power system of claim 1, wherein the piston body of each of the pistons is a hollow tube.

5. The power system of claim 1, wherein the cylinder is assembled to a frame of a vehicle.

6. The power system of claim 1, further comprising:
   a second cylinder; and
   third and fourth pistons coaxially disposed within the second cylinder, at least one of the pistons coupled to the vehicle drivetrain;
   wherein the second cylinder is fluidly connected to the common pressure source.

7. The power system of claim 1, further comprising:
   a first canister containing a first working fluid, the first canister being fluidly connected to the first inlet and the common pressure source.

8. The power system of claim 7, wherein the common pressure source contains a driving fluid under pressure and in fluidly sealed communication with the first canister, the driving fluid being different from the first working fluid, and further wherein the driving fluid exerts a force onto the first working fluid within the first canister to pressurize the first working fluid relative to the first inlet.

9. The power system of claim 8, wherein the driving fluid is a gas and the first working fluid is a hydraulic liquid.

10. The power system of claim 8, further comprising a fluid circuit fluidly connecting the first canister and the first inlet.

11. The power system of claim 10, wherein the first canister forms a pressure source inlet fluidly connected to the common pressure source and through which the driving fluid flows, an outlet and a refill inlet, the outlet and the refill inlet establishing a flow path for the first working fluid via the fluid circuit, and further wherein the fluid circuit includes means for delivering the first working fluid to the first inlet via the outlet and means for returning the first working fluid to the first canister via the refill inlet.

12. The power system of claim 11, wherein the means for delivering includes a one-way valve that prevents fluid flow into the first canister via the outlet.

13. The power system of claim 11, wherein the means for returning includes a reservoir selectively fluidly connected to the first inlet and a pump fluidly connected between the reservoir and the refill inlet.

14. The power system of claim 11, wherein the pump is an electrically powered pump.

15. The power system of claim 11, wherein the pump is adapted to be powered by a source selected from the group consisting of a braking system of the vehicle, rotational movement of one or more wheels of the vehicle, and lateral movement of one or more wheels of the vehicle.

16. The power system of claim 7, wherein the first canister is fluidly connected to the second inlet such that the first working fluid serves as the working fluid for both of the first and second pistons.

17. The power system of claim 7, further comprising:
a second canister containing a second working fluid, the second canister being fluidly connected to the second inlet and the common pressure source such that a pressure generated at the common pressure source acts upon the second working fluid within the second canister.

18. A vehicle comprising:
a frame;
wheels rotatably associated with the frame;
a power system maintained by the frame, the power system comprising:
   a cylinder defining a central bore extending between first and second open ends,
   the cylinder forming a first inlet adjacent the first open end and a second inlet adjacent the second open end,
   first and second pistons coaxially disposed within the central bore, each of the pistons including:
      a leading end terminating at a head that is movably sealed within the central bore,
      a trailing end extending from the corresponding open end of the cylinder and adapted for coupling to the vehicle drivetrain,
      a piston body extending between the leading and trailing ends and defining an outer diameter,
      wherein the outer diameter of the piston body is at least 75% of a diameter of the central bore, and
   a common pressure source in fluid communication with each of the first and second inlets,
   wherein forced flow of working fluid into the first inlet in conjunction with release of working fluid from the second inlet effectuates movement of the pistons in a first direction, and forced flow of working fluid into the second inlet and release of working fluid from the first inlet effectuates movement of the pistons in an opposite, second direction; and
a drivetrain coupling the power system to at least one of the wheels such that operation of the power system causes forced rotation of at least one of the wheels.

19. The vehicle of claim 18, further comprising:
a canister containing the working fluid and fluidly connected to the common pressure source and the first inlet such that pressure generated at the common pressure source acts upon the working fluid with the canister;
valving means for selectively permitting flow of the working fluid from the canister; and
actuation means coupled to the valving means for controlling operation of the valving means, the actuation means including a user-operated foot pedal.

* * * * *